US008698000B2

(12) United States Patent  (10) Patent No.: US 8,698,000 B2
Moriwaki  (45) Date of Patent: Apr. 15, 2014

(54) SUBSTRATE FOR DISPLAY DEVICE AND DISPLAY DEVICE

(75) Inventor: Hiroyuki Moriwaki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 283 days.

(21) Appl. No.: 12/998,380

(22) PCT Filed: Jul. 24, 2009

(86) PCT No.: PCT/JP2009/063291
§ 371 (c)(1),
(2), (4) Date: Apr. 14, 2011

(87) PCT Pub. No.: WO2010/064468
PCT Pub. Date: Jun. 10, 2010

(65) Prior Publication Data
US 2011/0199738 A1  Aug. 18, 2011

(30) Foreign Application Priority Data
Dec. 5, 2008  (JP) .................................. 2008-311121

(51) Int. Cl.
  *H05K 1/00*  (2006.01)
(52) U.S. Cl.
  USPC ........... 174/250; 174/262; 174/257; 174/260; 174/261; 361/748; 349/149; 349/150; 349/151; 349/152
(58) Field of Classification Search
  None
  See application file for complete search history.

(56) References Cited

U.S. PATENT DOCUMENTS 5,835,177 A  11/1998  Dohjo et al.
(Continued)

FOREIGN PATENT DOCUMENTS

EP  2360661  8/2011
JP  5019282 A  1/1993
(Continued)

OTHER PUBLICATIONS

English translation of the ISR dated Sep. 8, 2009 for PCT/JP2009/062061.
(Continued)

*Primary Examiner* — Tuan T Dinh
*Assistant Examiner* — Steven T Sawyer
(74) *Attorney, Agent, or Firm* — Harness, Dickey & Pierce, P.L.C.

(57) ABSTRACT

A substrate for a display device is disclosed which enables further reduction in area of a frame region and a display device comprising the substrate. In at least one embodiment, the present invention relates to a substrate for display device, comprising: a plurality of external connection terminals; and a plurality of lower wirings running below the plurality of external connection terminals; wherein the substrate further comprises an interlayer insulating film positioned between a layer of the plurality of external connection terminals and a layer of the plurality of lower wirings and provided with a plurality of connection holes, the plurality of lower wirings are running alongside each other in a direction across the plurality of external connection terminals and bent toward the same side with respect to the running direction in order from an endmost lower wiring, in a plan view of the substrate for display device, and each of the plurality of external connection terminals is connected through at least one of the plurality of through holes to a portion beyond the bent portion of any of the plurality of lower wirings.

12 Claims, 23 Drawing Sheets

(56) References Cited

U.S. PATENT DOCUMENTS

| | | | |
|---|---|---|---|
| 6,275,278 | B1 | 8/2001 | Ono et al. |
| 6,734,940 | B2 | 5/2004 | Hirabayashi |
| 7,391,493 | B2 | 6/2008 | Kim |
| 7,443,478 | B2 * | 10/2008 | Hirakata et al. ............. 349/149 |
| 7,868,989 | B2 | 1/2011 | Yokota |
| 2002/0071086 | A1 | 6/2002 | Kim et al. |
| 2004/0085504 | A1 | 5/2004 | Kim et al. |
| 2004/0165120 | A1 | 8/2004 | Woo et al. |
| 2004/0232418 | A1 | 11/2004 | Koyama et al. |
| 2006/0119778 | A1 * | 6/2006 | Oda et al. ..................... 349/149 |
| 2006/0238450 | A1 | 10/2006 | Onodera |
| 2007/0296674 | A1 * | 12/2007 | Aoki et al. ..................... 345/94 |
| 2008/0173900 | A1 | 7/2008 | Yoon et al. |
| 2011/0205716 | A1 | 8/2011 | Moriwaki |

FOREIGN PATENT DOCUMENTS

| | | |
|---|---|---|
| JP | 10161149 A | 6/1998 |
| JP | 10282522 A | 10/1998 |
| JP | 11024094 A | 1/1999 |
| JP | 2002202522 A | 7/2002 |
| JP | 2002258768 A | 9/2002 |
| JP | 2004-347822 | 12/2004 |
| JP | 2006146040 A | 6/2006 |
| JP | 2006-215480 | 8/2006 |
| JP | 2006-309161 | 11/2006 |
| JP | 2008058864 A | 3/2008 |
| WO | WO 2010/058619 | 5/2010 |

OTHER PUBLICATIONS

Office Action dated Oct. 24, 2013 in corresponding application No. 13/131,385.

\* cited by examiner (a)

(b)

SUBSTRATE FOR DISPLAY DEVICE AND DISPLAY DEVICE

TECHNICAL FIELD

The present invention relates to a substrate for display device and a display device. More specifically, the present invention relates to a substrate for display device provided with external connection terminals for connection of flexible printed circuits (FPC), and a display device suitably used in a liquid crystal display device or organic electroluminescence display device (organic EL display) provided with such a substrate for display device.

BACKGROUND ART

Portable electronic devices such as mobile phones and PDAs which include liquid crystal display devices, organic electroluminescent display devices and the like, now need a further reduction in size and weight. Along with this, downsize of a periphery of a display region, i.e., a reduction in area of a frame region is needed, and a technology of satisfying such a need is now being researched and developed.

Examples of such display devices include a display device equipped with a common wiring for powering a scanning line driving circuit for driving a scanning line, a common wiring for powering a signal-line driving circuit for driving a signal line, an interlayer insulating film for respectively insulating the common wirings, and a plurality of external connection terminals positioned above a plurality of contact holes provided in the interlayer insulating film in a manner such that each of the common wirings are partially exposed (see Patent Document 1).

[Patent Document 1]
Japanese Kokai Publication No. Hei-10-282522

DISCLOSURE OF INVENTION

However, the technical art disclosed in Patent Document 1 have failed to achieve enough reduction in area of a frame region.

The present invention was made in view of the above-mentioned state of the art, and an object thereof is to provide a substrate for display device which enables further reduction in area of a frame region and a display device comprising the substrate.

The present inventors made various investigations on a substrate for display device which enables further reduction in area of a frame region and a display device and focused their attentions on a technical art for providing a wiring in a layer lower than the external connection terminals (lower wiring). The present inventors found out the followings. The simple use of the conventional art leads to formation of a large connection hole, relative to the width of the wiring, for electrically connecting an external connection terminal with a lower wiring due to the processing accuracy of an interlayer insulating film provided between the external connection terminal and the lower wiring. This reduces the number of the lower wirings. In contrast, it is possible to avoid placing connection holes above the running direction of the lower wirings to narrow the spacing of the adjacent lower wirings, provided that a plurality of lower wirings are running alongside each other in a direction across a plurality of external connection terminals, bent toward the same side with respect to the running direction in order from the endmost lower wiring, and respectively connected to portions beyond the bent portions of the lower wirings. As a result, the above-mentioned problems have been admirably solved, leading to completion of the present invention.

Namely, the present invention provides a substrate for display device, comprising: a plurality of external connection terminals; and a plurality of lower wirings running below the plurality of external connection terminals; wherein the substrate further comprises an interlayer insulating film positioned between a layer of the plurality of external connection terminals and a layer of the plurality of lower wirings and provided with a plurality of connection holes, the plurality of lower wirings are running alongside each other crossing the plurality of external connection terminals and bent toward a same side with respect to the running direction in order from an endmost lower wiring, in a plan view of the substrate for display device, and each of the plurality of external connection terminals is connected through at least one of the plurality of connection holes to a portion beyond the bent portion of any of the plurality of lower wirings.

In the substrate for display device of the present invention, since no connection hole is provided above the running direction of the lower wirings, it is possible to narrow the spacing of the adjacent lower wirings. Accordingly, it is possible to increase the number of the lower wirings arranged below the external connection terminals so that further reduction in area of a frame region is achieved. Therefore, it is preferable not to arrange a connection hole in a region where the lower wiring is running across the plurality of external connection terminals.

Here, a plurality of lower wirings running alongside each other are not required to be arranged strictly in parallel with each other. In addition, a plurality of lower wirings bent toward the same side do not need to be bent to exactly the same direction relative to the running direction. Exemplary modes include a mode where lower wirings are bent together inwardly or to the peripheral side of the substrate for display device. Further, the endmost wiring may be the endmost wiring on the peripheral side of the substrate for display device or the endmost wiring on the inner side of the substrate for display device. In addition, the running direction may be a direction across the plurality of outer connection terminals.

In the present description, "above, up" refers to a side more distant from an insulating substrate (e.g. glass substrate, plastic substrate, silicon substrate) in the substrate for display device and "below, low, under" refers to a side closer to the insulating substrate in the substrate for display device. Namely, an upper layer refers to a layer more distant from the insulating substrate in the substrate for display device and a lower layer refers to a layer closer to the insulating substrate in the substrate for display device.

Additionally, in the present description, the connection hole may be a hole normally referred to as a contact hole, a through hole, or a via hole.

The configuration of the substrate for display device of the present invention is not especially limited as long as it essentially includes such components. The substrate for display device may or may not include other components.

The plurality of connection holes may be provided collinearly in a plan view of the substrate for display device. This allows further reduction in area of a frame region.

The present invention also provides a display device provided with the substrate for display device of the present invention. This allows production of a display device having a smaller frame region.

The configuration of the display device of the present invention is not especially limited as long as it essentially includes such components. The display device may or may not include other components.

Preferable embodiments of the display device of the present invention are mentioned in more detail below. The following embodiments may be employed in combination.

The display device may further comprise: an external connection component having a plurality of connecting portions; and a plurality of conductive members electrically connecting the substrate for display device with the external connection component, each of the plurality of external connection terminals is connected via at least one of the plurality of conductive members to any of the plurality of connecting portions, and the plurality of connection holes are positioned outside a region where the plurality of connecting portions and the plurality of conductive members overlap each other, in a plan view of the substrate for display device. In this embodiment, even if the external connection component is thermocompressed to the substrate for display device, conductive layers of the external connection terminals are less likely to be collapsed by the conductive members, as no connection hole is present in a region where the connecting portions and the conductive members overlap to be susceptible to pressure application during the thermocompression. As a result, it is possible to prevent a connection failure.

Here, the connecting portions refer to connection terminals such as bumps and wirings which can be connected to the substrate for display device.

The display device may further comprise a sealing material for sealing a display element.

The plurality of connection holes may be positioned between the sealing material and the region where the plurality of connecting portions and the plurality of conductive members overlap each other, in a plan view of the substrate for display device. This allows arrangement of a connection hole in a marginal region between a sealing material and a conductive member. As a result, it is possible to prevent a connection failure and to keep increase in area of the frame region at the minimum.

The plurality of connection holes may be positioned further toward an inner side of the substrate for display device than the sealing material, in a plan view of the substrate for display device. This improves the reliability of the connecting portion of the external connection terminal.

The plurality of connection holes may overlap the sealing material in a plan view of the substrate for display device. This allows further reduction in area of the frame region.

In the present description, a mode where a member A overlaps a member B refers to a mode where the member A entirely overlaps the member B or a mode where the member A partially overlaps the member B.

The substrate for display device may further comprises a photo spacer positioned in the sealing material. This prevents a connection failure and allows further reduction in area of the frame region and improvement in reliability.

The substrate for display device may further comprises an insulating film formed below the sealing material. This prevents a connection failure and allows further reduction in area of the frame region and improvement in reliability.

The insulating film may be positioned below substantially the entire sealing material. This prevents deterioration in display quality which is caused by uneven cell thickness due to difference in level formed by the insulating film in a liquid crystal display device.

The plurality of conductive members may include conductive particles. Especially in a case where an anisotropic conductive film is used, the conductive layer of the external connection terminal may be cut in the form of a ring by conductive particles in the anisotropic conductive film, easily leading to a connection failure. When the conductive members contain the conductive particles, a defect such as a connection failure is effectively prevented.

EFFECT OF THE INVENTION

According to the substrate for display device and the display device of the present invention, further reduction in area of the frame region can be achieved.

BRIEF DESCRIPTION OF THE DRAWINGS

FIG. 2(*a*) is a cross-sectional view taken along A-B line in FIG. 1 and FIG. 2(*b*) is a cross-sectional view taken along C-D line in FIG. 1.

FIG. 3-1 is a schematic plan view illustrating a configuration of a frame region in a liquid crystal display device of Embodiment 2.

FIG. 3-2 is a schematic cross-sectional view illustrating a configuration of the frame region in the liquid crystal display device of Embodiment 2 and is a cross-sectional view taken along E-F line in FIG. 3-1.

FIG. 5-1 is a schematic plan view illustrating a modified example of the configuration of the frame region in the liquid crystal display device of Embodiment 2.

FIG. 5-2 is a schematic cross-sectional view illustrating the modified example of a configuration of the frame region in the liquid crystal display device of Embodiment 2 and is a cross-sectional view taken along G-H line in FIG. 5-1.

FIG. 6-1 is a schematic plan view illustrating a modified example of the configuration of the frame region in the liquid crystal display device of Embodiment 2.

FIG. 6-2 is a schematic cross-sectional view illustrating the modified example of the configuration of the frame region in the liquid crystal display device of Embodiment 2 and is a cross-sectional view taken along I-J line in FIG. 6-1.

FIG. 7-1 is a schematic plan view illustrating a modified example of the configuration of the frame region in the liquid crystal display device of Embodiment 2.

FIG. 7-2 is a schematic cross-sectional view illustrating the modified example of the configuration of the frame region in the liquid crystal display device of Embodiment 2 and is a cross-sectional view taken along K-L line in FIG. 7-1.

FIG. 8-1 is a schematic cross-sectional view illustrating a modified example of the configuration of the frame region in the liquid crystal display device of Embodiment 2.

FIG. 8-2 is a schematic cross-sectional view illustrating the modified example of the configuration of the frame region in the liquid crystal display device of Embodiment 2 and is a cross-sectional view taken along M-N line in FIG. 8-1.

FIG. 13(a) is a cross-sectional view taken along P-Q line in FIG. 12 and FIG. 13(b) is a cross-sectional view taken along R-S line in FIG. 12.

FIG. 14-1 is a schematic cross-sectional view illustrating a configuration of a frame region in a liquid crystal display device of Comparative Embodiment 1.

FIG. 14-2 is a schematic cross-sectional view illustrating the configuration of the frame region in the liquid crystal display device of Comparative Embodiment 1 and is a cross-sectional view taken along T-U line in FIG. 14-1.

FIG. 16-1 is a schematic plan view illustrating a modified example of the configuration of the frame region in the liquid crystal display device of Embodiment 2.

FIG. 16-2 is a schematic cross-sectional view illustrating the modified example of the configuration of the frame region in the liquid crystal display device of Embodiment 2 and is a cross-sectional view taken along V-W line in FIG. 16-1.

MODES FOR CARRYING OUT THE INVENTION

The present invention is mentioned in more detail below with reference to Embodiments using drawings, but not limited to only these Embodiments.
(Embodiment 1)

Figure 1:
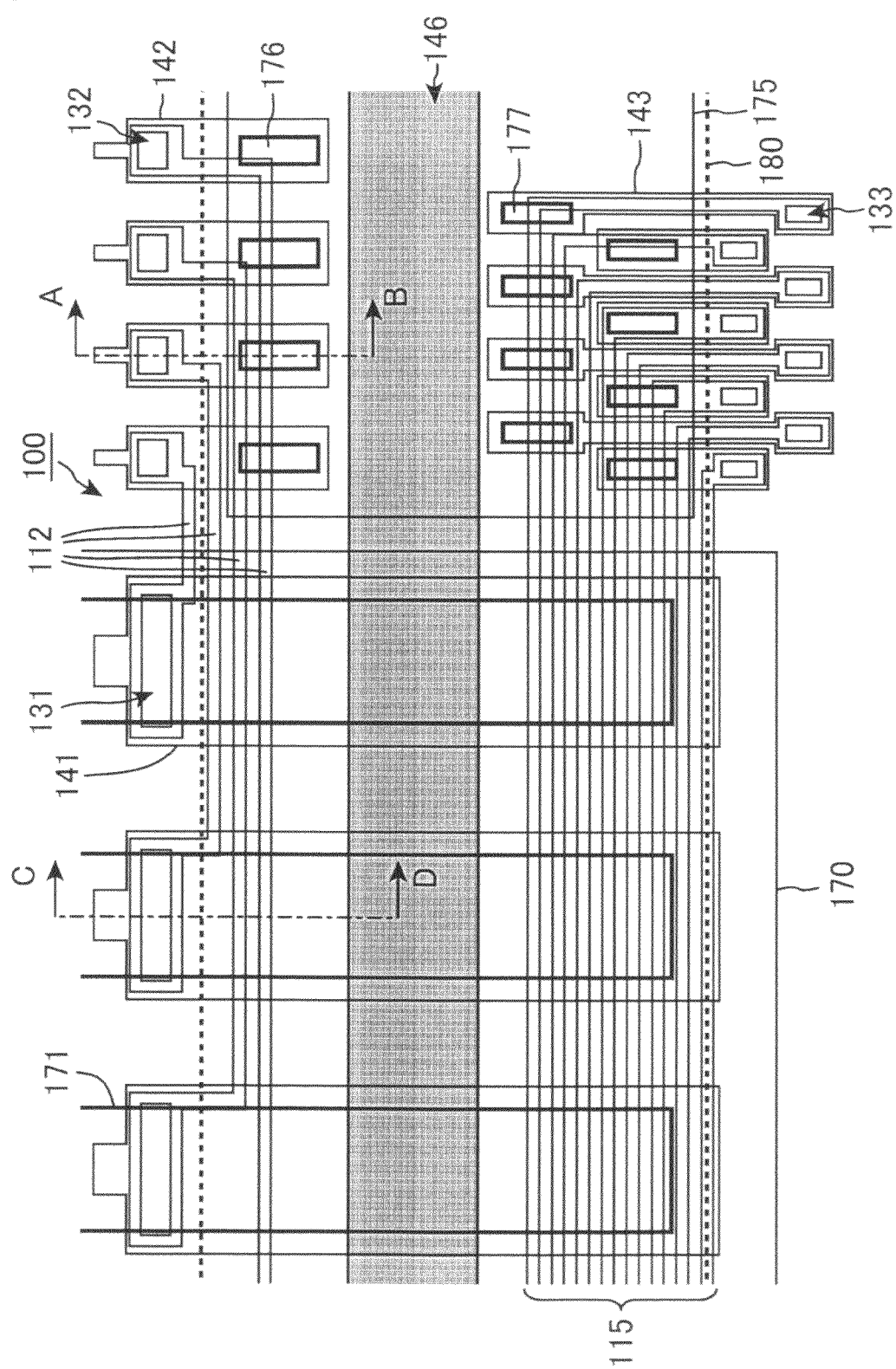
FIG. 1 is a schematic plan view illustrating a configuration of a frame region in a liquid crystal display device of Embodiment 1.
Figure 2:
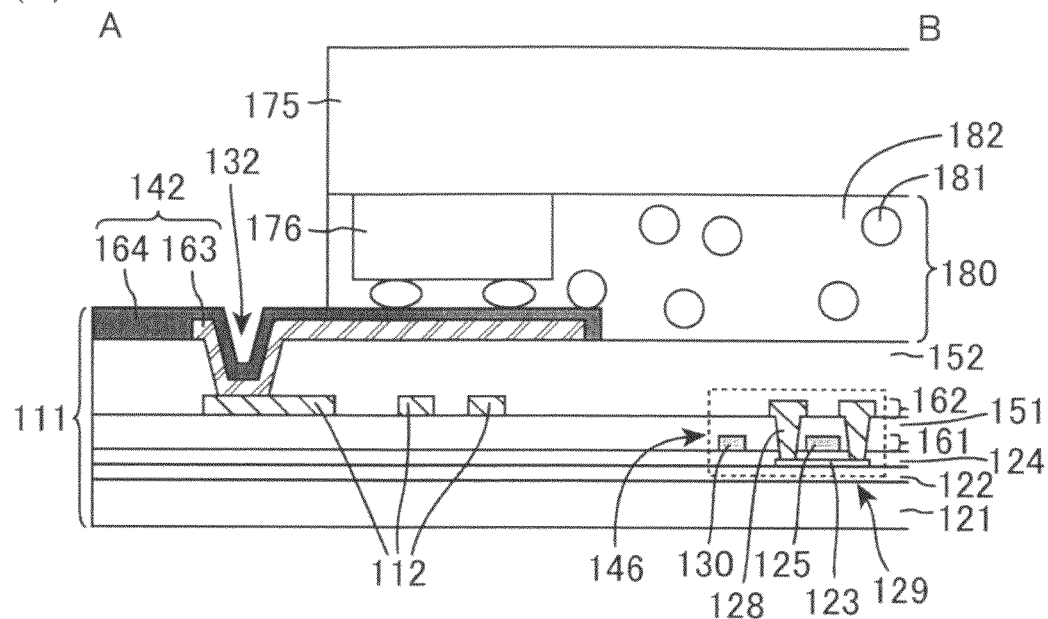
FIG. 2 are schematic cross-sectional views each illustrating a configuration of the frame region of the liquid crystal display device of Embodiment 1.
Figure 2:
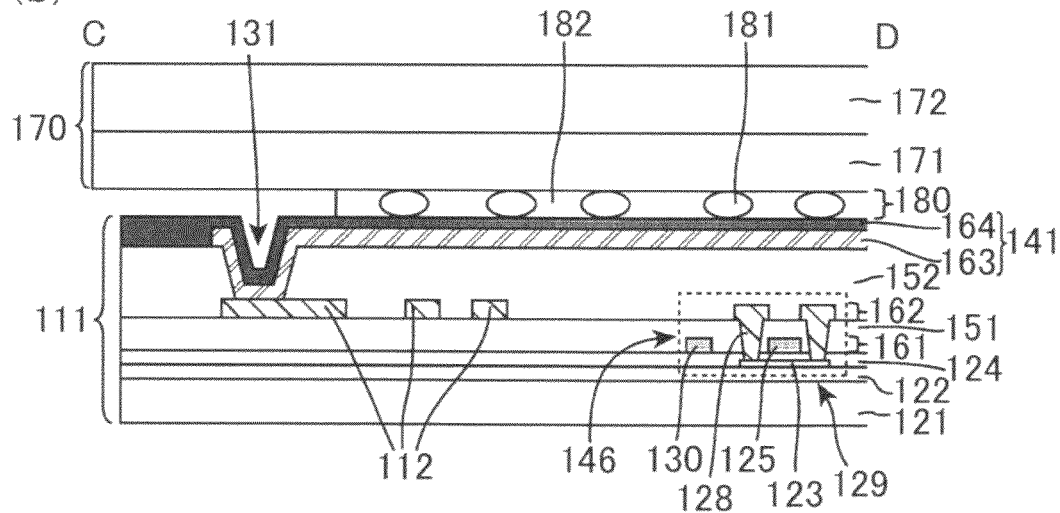

FIG. 1 is a schematic plan view illustrating a configuration of a frame region in a liquid crystal display device of Embodiment 1. FIG. 2 are schematic cross-sectional views each illustrating the configuration of the liquid crystal display device of Embodiment 1. FIG. 2(a) is a cross-sectional view taken along A-B line in FIG. 1 and FIG. 2(b) is a cross-sectional view taken along C-D line in FIG. 1.

As illustrated in FIGS. 1 and 2, a liquid crystal display device 100 of the present embodiment has a configuration in which a thin film transistor (TFT) substrate 111 as a substrate for display device is connected via an ACF (Anisotropic Conductive Film) 180 to a FPC (Flexible Printed Circuits) 170 and an IC chip 175 as external connection members, in a frame region of the liquid crystal display device. The FPC 170 and the IC chip 175 are arranged side by side along one side of the TFT substrate 111 having a rectangular shape in a plan view. In the present embodiment and in other embodiments described later, the FPC 170 may comprise only a flexible base or the FPC 170 may be a rigid FPC comprising a flexible base and a hard (rigid) part attached thereto. In the following, a case of using a rigid FPC is described. A flexible base part comprising polyimide and the like is called a FPC and a part where electronic components, such as various chips included in a liquid crystal controller and the like, a resistor, and a condenser, are mounted is called a rigid. The assembly of the base part and the rigid is called a rigid FPC.

In addition to the TFT substrate 111, the liquid crystal display device 100 further comprises a CF substrate positioned opposite to the TFT substrate 111. The CF substrate comprises, on an insulating substrate, (1) a black matrix comprising a shading material and color filters of red, green, and blue, (2) an overcoat layer, (3) a common electrode comprising a transparent conductive film, and (4) an alignment film, in this order from the side of the insulating substrate. The TFT substrate 111 and the CF substrate are sealed at the periphery by a sealing material in a frame shape and the gap therebetween is filled with a liquid crystal material. On the TFT substrate 111, the rigid FPC 170 and the IC chip 175 are positioned in a region other than the region where the TFT substrate 111 is opposed to the CF substrate.

The rigid FPC 170 comprises a plurality of wirings 171 running alongside each other on a base 172. The plurality of wirings 171 function as connection terminals (connecting portions) of the rigid FPC 170. The rigid FPC 170 has electronic components such as various chips included in a liquid crystal controller and the like, a resistor, and a condenser mounted thereon.

The IC chip 175 has signal input bumps 176 and signal output bumps 177. The bumps 176 and 177 function as connection terminals (connecting portions) of the IC chip 175. The IC chip 175 is mounted, as a bare chip, on the TFT substrate 111, according to a COG (Chip on Glass) technique. The IC chip 175 normally comprises a source driver, a gate driver, a power supply circuit, a censor circuit, and the like. Here, circuits to be included in the IC chip 175 are determined by the properties of a TFT to be formed on the TFT substrate 111. For example, the properties of the TFT to be formed on the TFT substrate 111 are varied in accordance with its material, such as LPS (low-temperature polysilicon), CGS (continuous grain silicon), and amorphous silicon. Therefore, the circuits to be included in the IC chip 175 and the TFT substrate 111 are determined in consideration of operability of the circuits with the TFT to be formed on the TFT substrate 111, probability that the scale of the circuits becomes too large, probability that the yield rate is lowered, and the like. The signal input bumps 176 are arranged alongside each other and the signal output bumps 177 are provided in a staggered alignment, i.e. in two rows in staggered configuration. Here, the IC chip 175 may be a LSI chip, of course.

The TFT substrate 111 comprises a plurality of external connection terminals 141, a plurality of external connection terminals 142, and a plurality of external connection terminals 143. The plurality of external connection terminals 141 correspond to the wirings 171 in the rigid FPC 170 and are aligned alongside each other. The plurality of external connection terminals 142 correspond to the signal input bumps 176 and are aligned alongside each other. The plurality of external connection terminals 143 correspond to the signal output bumps 177 and are in a strip shape.

An ACF 180 covers the external connection terminals 141, 142, and 143. The external connection terminals 141 are connected to the wirings 171 of the rigid FPC 170 via conductive beads (conductive particles) 181 that are conductive members in the ACF 180. The external connection terminals 142 are connected to the signal input bumps 176 via the conductive beads 181. The external connection terminals 143 are connected to the signal output bumps 177 via the conductive beads 181.

Each external connection terminal 141 is connected through a contact hole 131 provided in an interlayer insulating film 152 formed in a layer below the external connection terminal 141, to a wiring connecting portion positioned at one end of a wiring 112 that is a lower wiring formed in a layer below the interlayer insulating film 152. Here, the wiring connecting portion is a part of the wiring, and more specifically a portion connecting (contacting) to a conductive member such as another wiring and a terminal. The wiring 112 extends from the point under the external connection terminal 141 to the point under the external connection terminal 142. A wiring connecting portion at the other end of the wiring 112 is connected to the external connection terminal 142 through the contact hole 132 provided in the interlayer insulating film 152. In this manner, the rigid FPC 170 supplies a signal and electricity to the IC chip 175.

The contact holes 131 are provided collinearly (along a line in parallel with the running direction of the wirings 112) in positions corresponding to the ends of the external connection terminals 141 positioned on the peripheral side of the TFT substrate 111. The contact holes 131 overlap with the wirings 171 of the rigid FPC 170 but not with the ACF 180. Namely, the contact holes 131 are positioned outside a region where the wirings 171 and the ACF 180 overlap with each other. Accordingly, each external connection terminal 141 is connected to any of the wirings 112 in a region other than the region where the wiring 171 and the ACF 180 overlap with each other. The external connection terminal 141 has a portion connecting with the wiring 171 of the rigid FPC 170 (a portion contacting with the conductive beads 181) and a portion connecting with the wiring 112 (a portion contacting with the wiring connecting portion of the wiring 112) separately. The portion connecting with the wiring 112 is positioned not to overlap with both the wiring 171 of the rigid FPC 170 and the ACF 180.

The contact holes 132 are provided collinearly (along a line in parallel with the running direction of the wirings 112) in the ends of the external connection terminals 142 positioned on the peripheral side of the TFT substrate 111. The contact holes 132 are positioned not to overlap with both the signal input bumps 176 and the ACF 180. Accordingly, each external connection terminal 142 is connected to any of the wirings 112 in a region other than the region where the signal input bump 176 and the ACF 180 overlap with each other. The external connection terminal 142 has a portion connecting with the signal input bump 176 (a portion contacting with the conductive beads 181) and a portion connecting with the wiring 112 (a portion contacting with the wiring connecting portion of the wiring 112) separately. The portion connecting with the wiring 112 is positioned not to overlap with both the signal input bump 176 and the ACF 180.

The external connection terminals 141 and 142 are arranged along the region where the ACF 180 is positioned. The wirings 112 below the external connection terminals 141 and 142 are running alongside each other mainly in the array direction of the external connection terminals 141 and 142. The wirings 112 are bent in the vicinity of their ends on one side toward the same side (direction towards the periphery of the TFT substrate 111 and orthogonal to the running direction of the wirings 112) in order from the endmost wiring on the peripheral side of the TFT substrate 111. The wiring connecting portions contacting with the external connection terminals 141 are provided at portions beyond the bent portions of the wirings 112. Further, the wirings 112 are also bent in the vicinity of their ends on the other side toward the same side (direction towards the periphery of the TFT substrate 111 and orthogonal to the running direction of the wirings 112) in order from the endmost wiring on the peripheral side of the TFT substrate 111. The wiring connecting portions contacting with the external connection terminals 142 are provided at the portions beyond the bent portions of the wirings. Accordingly, each wiring 112 have a square U-shape in a plan view.

On the other hand, each external connection terminal 143 is connected to a wiring connecting portion positioned on one end portion of a common wiring 115 that is a lower wiring formed in a layer below the interlayer insulating film 152, through a contact hole 133 provided in the interlayer insulating film 152. Each common wiring 115 extends from the point under the external connection terminal 143 and pass beneath the external connection terminal 141. Then, the common wiring 115 is connected to an element of the TFT substrate 111, such as a semiconductor element, a capacitor, and a resistor. The semiconductor element is normally a transistor, more specifically a TFT. Each common wiring 115 is connected to two or more elements, such as a semiconductor element, a capacitor, and a resistor, to supply a common signal and electricity thereto. In this manner, an output signal and the output electricity generated from the IC chip 175 are supplied to each element on the TFT substrate 111, such as a semiconductor element, a capacitor, and a resistor.

The contact holes 133 are provided in a staggered alignment corresponding to the ends of the external connection terminals 143 positioned at the inner side of the TFT substrate 111. The contact holes 133 are positioned not to overlap with both the signal output bumps 177 and the ACF 180. Accordingly, each external connection terminal 143 is connected to any of the common wirings 115 in a region other than the region where the signal output bump 177 and the ACF 180 overlap with each other. Namely, the external connection terminal 143 has a portion connecting with the signal output bump 177 (a portion contacting with the conductive beads 181) and a portion connecting with the common wiring 115 (a portion contacting with the wiring connecting portion of the common wiring 115) separately. The portion connecting with the common wiring 115 is positioned not to overlap with both the signal output bump 177 and the ACF 180.

The external connection terminals 141 and 143 are arranged along the region where the ACF 180 is positioned. The common wirings 115 below the external connection terminals 141 and 143 are running alongside each other mainly in the array direction of the external connection terminals 141 and 143. The common wirings 115 are bent in the vicinity of their ends on one side toward the same side (direction towards the periphery of the TFT substrate 111 and orthogonal to the running direction of the common wirings 115) in order from the endmost wiring on the inner side of the TFT substrate 111. The wiring connecting portions contacting with the external connection terminals 143 are provided at portions beyond the bent portions of the common wirings. Accordingly, each common wiring 115 has an L-shape in a plan view.

A circuit block 146 including a TFT 129 and a routing wiring 130 is directly formed in the TFT substrate 111 over regions where the TFT substrate 111 overlaps the rigid FPC 170 and with the IC chip 175. In the circuit block 146, a circuit which is not overlapping with the circuit in the IC chip 175 is formed, such as a source driver, a gate driver, and a power supply circuit.

In the following, the cross section structure of the liquid crystal display device 100 is more specifically described.

As illustrated in FIGS. 2(a) and 2(b), the frame region of the TFT substrate 111 has a lamination structure comprising a basecoat film 122, a semiconductor layer 123, a gate insulating film 124, a first wiring layer 161, an interlayer insulating film 151, a second wiring layer 162, an interlayer insulating film 152, a third wiring layer 163, a transparent conductive layer 164 sequentially laminated on an insulating substrate 121 in this order. The TFT 129 includes the semiconductive layer 123, the gate insulating film 124, and a gate electrode 125 formed by the first wiring layer 161. Further, a source-drain wiring 128 comprising the second wiring layer 162 is connected to a source drain region of the semiconductor layer 123 via a contact hole penetrating the interlayer insulating film 151 and the gate insulating film 124.

The first wiring layer 161 forms the routing wiring 130. The second wiring layer 162 forms the wirings 112 and the common wirings 115. A lamination of the third wiring layer 163 and the transparent conductive layer 164 forms external connection terminals 141, 142, and 143. The rigid FPC 170 and the IC chip 175 are respectively thermocompressed to the TFT substrate 111 by interposing the ACF 180. In this manner, they are connected to the TFT substrate 111 via conductive beads 181 in the ACF 180 and fixed with the TFT substrate 111 by an adhesive component 182 which comprises a thermosetting resin and is contained in the ACF 180.

Further, pressure is applied via the conductive beads 181 during the thermocompression to the external connection terminals 141, 142, and 143, and their corresponding components including the wirings 171 of the rigid FPC 170, the signal input bumps 176 and the signal output bumps 177 of the IC chip 175. Accordingly, if contact holes 131, 132, and 133 are provided in regions where the pressure is applied (regions where the wirings 171, the signal input bumps 176, and the signal output bumps 177 overlap with the conductive beads 181), there may be a case where the external connection terminals 141, 142, and 143 are collapsed in the regions during the thermocompression, leading to a connection failure, as the lamination of the third wiring layer 163 and the transparent conductive layer 164 in the contact hole is thinner compared to the other portions. Especially in a case where the conductive beads 181 contained in the ACF 180 are used as conductive materials, the external connection terminals 141, 142, and 143 may be cut in the shape of a ring so that a connection failure occurs frequently.

In contrast, the contact holes 131, 132, and 133 are positioned in regions other than the regions where the conductive beads 181 overlap with the wirings 171 of the rigid FPC 170, the signal input bumps 176 and the signal output bumps 177 of the IC chip 175 respectively in a plan view of the TFT substrate 111 in the liquid crystal display device 100. Accordingly, it is possible to avoid pressure application to the external connection terminals 141, 142, and 143 in the thin portions of the films in the contact holes 131, 132, and 133 during thermocompression as the conductive beads 181 contact only with comparatively-thick portions on the top surface of the external connection terminals 141, 142, and 143. As a result, it is possible to prevent contact failures between the TFT substrate 111 and the rigid FPC 170, and between the TFT substrate 111 and the IC chip 175, which may be caused by a collapse of the external connection terminals 141, 142, and 143.

The present technical level of mass production allows reduction in linewidth and spacing (line and space) between the wiring groups, such as the wirings 112 and the common wirings 115, to about 2 µm by dry etching employed in microfabrication. When photolithography is carried out by using the interlayer insulating film 152 provided on the wiring groups as a photosensitive organic insulating film, line and space of about 4 µm is the limit of microfabrication. Accordingly, in order to form the contact holes 131, 132, and 133 for connecting the wiring groups with the external connection terminals 141, 142, and 143 on such wiring groups, the actual contact holes 131, 132, and 133 need to be larger than the width of the wiring groups from the standpoint of position control accuracy and microprocessing accuracy of the contact holes 131, 132, and 133. Therefore, simple arrangement of the contact holes 131, 132, and 133 on the running region of the wiring groups may increase the distance between the adjacent wirings, leading to decrease in number of the wirings which can be arranged below the external connection terminals 141, 142, and 143.

In contrast, in the liquid crystal display device 100, the wirings 112 are running alongside each other crossing the external connection terminals 141 and 142 and bent toward the same side with respect to the running direction (direction crossing the external connection terminals 141 and 142) in order from an endmost wiring, in a plan view of the TFT substrate 111, and contact holes 131 and 132 are connected to portions beyond the bent portions (wiring connecting portions) of the wirings 112. Further, the common wirings 115 are running alongside each other crossing the external connection terminals 141 and 143 and bent toward the same side with respect to the running direction (direction crossing the external connection terminals 141 and 143) in order from an endmost wiring, in a plan view of the TFT substrate 111, and contact holes 133 are connected to portions beyond the bent portions (wiring connecting portions) of the wirings 112. Accordingly, arrangement of the contact holes 131, 132, and 133 outside the running regions of the wirings 112 and the common wirings 115 can keep the line and space of the wiring groups such as the wirings 112 and the common wirings 115 as narrow as possible even in the case where the interlayer insulating film 152 is a photosensitive organic insulating film. In addition, it is possible to keep the line and space as narrow as possible regardless of the number of the wirings in the wiring groups. Consequently, reduction in area of the frame region is achieved as it is not necessary to reduce the number of the wirings which can be arranged below the external connection terminals 141, 142, and 143.

Additionally, since the contact holes 131 and 132 are provided collinearly (more preferably, along a line in parallel with the running direction of the wirings 112) in a plan view of the TFT substrate 111, it is possible to have the area of the entire region where the contact holes 131 and 132 are arranged smaller while ensuring the appropriate size of the respective contact holes 131 and 132 in comparison with the case where the contact holes 131 and 132 are arranged at random, for example, in a zigzag pattern. Namely, more reduction in area of the frame region is achieved.

Here, the planar shape of the contact holes 131, 132, and 133 are not particularly limited. Additionally, each contact hole 131, 132, or 133 may be divided into a plurality of holes.

In the following, description is given on an example of the production method of the liquid crystal display device of Embodiment 1.

First, a pretreatment including cleaning and pre-annealing is carried out to an insulating substrate 121. The insulating substrate 121 is not particularly limited and a glass substrate or a resin substrate is preferably used from a standpoint of cost and the like. The following steps of (1) to (15) are carried out subsequently.

(1) Formation of Basecoat Film

A SiON film having a thickness of 50 nm and a SiOx film having a thickness of 100 nm are formed on the insulating substrate 121 in this order with use of a PECVD (Plasma Enhanced Chemical Vapor Deposition) method so that a basecoat film 122 is formed. Examples of the source gas for forming the SiON film include mixed gas containing monosilane ($SiH_4$), nitrous oxide gas ($N_2O$), and ammonia ($NH_3$). The SiOx film is preferably formed with use of TEOS (Tetra Ethyl Ortho Silicate) gas as a source gas. The basecoat film 122 may include a silicon nitride (SiNx) film formed with use of a mixed gas containing monosilane ($SiH_4$) and ammonia ($NH_3$) as a source gas.

(2) Formation of a Semiconductor Layer

An amorphous silicon (a-Si) film having a thickness of 50 nm is formed by a PECVD method. Examples of the source gas for forming the a-Si film include $SiH_4$, and disilane ($Si_2H_6$). Since the a-Si film formed by a PECVD method contains hydrogen, the a-Si film is processed at about 500° C. to lower its hydrogen concentration (dehydrogenation). Subsequently, laser annealing is carried out to melt, cool, and crystallize the a-Si film so as to form a polycrystalline silicon (polysilicon, p-Si) film. Laser annealing is carried out by using, for example, an excimer laser. In forming a p-Si film, a metal catalyst such as nickel may be applied to the a-Si film without dehydrogenation and crystal growth from solid phase may be carried out by heat treatment (in order to obtain continuous grain silicon (CG-silicon)), as a pre-treatment of the laser annealing. Only crystal growth from solid phase by heat treatment may be carried out as crystallization of the a-Si film. Next, the p-Si film is patterned by dry etching with use of a mixed gas containing carbon tetrafluoride ($CF_4$) and oxygen ($O_2$) so that a semiconductor layer 123 is formed.

(3) Formation of Gate Insulating Film

A gate insulating film 124 comprising silicon oxide having a thickness of 45 nm is formed with use of TEOS gas as a source gas. The material of the gate insulating film 124 is not particularly limited and a SiNx film, SiON film or the like may be used. The source gas to form a SiNx film and a SiON film may be the source gas as same as the gas mentioned in the description of formation of a basecoat film. The gate insulating film 124 may be a lamination of a plurality of materials mentioned above.

(4) Ion Doping

To control the threshold value of the TFT 129, the semiconductor layers 123 are doped with impurities such as boron by ion doping or ion implantation. More specifically, the semiconductor layers to be formed into an N-channel type TFT and a P-channel type TFT are doped with impurities such as boron (first doping), and then, the semiconductor layer to be formed into an N-channel type TFT is further doped with impurities such as boron (second doping) while the semiconductor layer to be formed into a P-channel type TFT is masked with a resist. In the case where it is not necessary to control the threshold value of the P-channel type TFT, it is not necessary to carry out the first doping.

(5) Formation of First Wiring Layer

A tantalum nitride (TaN) film having a thickness of 30 nm and a tungsten (W) film having a thickness of 370 nm are formed in this order by a spattering method. Subsequently, the resist film is patterned in a desired pattern by a photolithography method so that a resist mask is formed. After that, dry etching is carried out with use of a mixed gas, as an etching gas, prepared by mixing controlled amounts of argon (Ar), sulfur hexafluoride ($SF_6$), carbon tetrafluoride ($CF_4$), oxygen ($O_2$), chlorine ($Cl_2$) and the like. In this manner, a first wiring layer 161 is formed. Examples of the material of the first wiring layer 161 include refractory metals having a flat surface and stable properties, such as tantalum (Ta), molybdenum (Mo), molybdenum tungsten (MoW), and low resistance metals such as aluminum (Al). The first wiring layer 161 may be a lamination comprising a plurality of materials mentioned above.

(6) Formation of source drain region

The semiconductor layer 123 is highly doped with impurities by ion doping or ion implantation with use of a gate electrode 125 as a mask so that a source drain region of the TFT 129 is formed. Here, the N-channel type TFT is doped with impurities such as phosphorus and the P-channel type TFT is doped with impurities such as boron. On this occasion, a LDD (Lightly Doped Drain) region may be optionally formed. Subsequently, heat activation at about 700° C. for six hours is carried out to activate impurity ions present in the semiconductor layer 123. This improves the electrical conductivity of the source drain region. Activation may also be carried out by irradiation with an excimer laser.

(7) Formation of Interlayer Insulating Film and Contact Hole

A SiNx film having a thickness of 100 to 400 nm (preferably 200 to 300 nm) and a TEOS film having a thickness of 500 to 1000 nm (preferably 600 to 800 nm) are formed on the entire surface of the insulating substrate 121 by a PECVD method. In this manner, an interlayer insulating film 151 is formed. A SiON film may also be used as the interlayer insulating film 151. In addition, a thin capping film (TEOS film, for example) having a thickness of about 50 nm may be formed below the interlayer insulating film 151 in order to prevent degradation of the TFT properties due to transient reduction and to stabilize the electrical properties of the TFT 129. After formation of a resist mask by patterning the resist film in a desired pattern by photolithography, wet etching is carried out to the gate insulating film 124 and the interlayer insulating film 151 with use of a hydrofluoric acid-type etching solution. In this manner, contact holes are formed in the gate insulating film 124 and the interlayer insulating film 151. Dry etching may also be used instead of wet etching.

(8) Hydrogenation

Heat treatment at about 400° C. for one hour is then carried out so that defects of Si crystals in the semiconductor layer 123 are corrected by hydrogen supplied from the SiNx film of the interlayer insulating film 151.

(9) Formation of Second Wiring Layer

A titanium (Ti) film having a thickness of 100 nm, an aluminum (Al) film having a thickness of 500 nm, and a Ti film having a thickness of 100 nm are formed by sputtering and the like in this order. Subsequently, a resist film is patterned in a desired pattern by a photolithography method so that a resist mask is formed. Then, a Ti/Al/Ti metal lamination is patterned by dry etching to form a second wiring layer 162. As a metal constituting the second wiring layer 162, Al—Si alloy may also be used instead of Al. In the present case, Al is used for lower resistance of the wirings. However, in the case where high thermal resistance is required and increase in resistance is acceptable to some extent (e.g. a case of short wiring structure), the materials of the first wiring layer 161 (Ta, Mo, MoW, W, TaN and the like) may be used as the metal constituting the second wiring layer 162.

(10) Formation of Interlayer Insulating Film and Contact Hole

A photosensitive resin film, such as a photosensitive acrylic resin film, having a thickness of 1 to 5 μm (preferably 2 to 3 μm) is formed on the entire surface of the insulating substrate 121 by a spin coat method and the like. In this manner, an interlayer insulating film 152 is formed. Exemplary materials of the interlayer insulating film 152 may include a non-photosensitive resin such as a non-photosensitive acrylic resin, a (non-)photosensitive polyalkylsiloxane resin, a (non-)photosensitive polysilazane resin, a (non-)photosensitive polyimide resin, or a (non-)photosensitive parellin resin. Exemplary materials of the interlayer insulating film 152 may also include methyl-containing polysiloxane (MSQ) materials and porous MSQ materials. In the case where a photosensitive resin is used as the material of the interlayer insulating film 152, a photosensitive resin film is exposed through a photo mask having a desired shading pattern first, and etching (development) is carried out to remove the photosensitive resin film in the region where the contact holes 131, 132, and 133 are to be formed. Subsequently, baking of the photosensitive resin film is carried out (for example, at 200° C. for 30 minutes). This treatment smooths the shape of the openings (holes) of the interlayer insulating film 152, so that the aspect ratio of the contact holes 131, 132, and 133 is reduced. In addition, ashing (detachment) is not needed in removing contact portions (portions to be contact holes 131, 132, and 133) of the interlayer insulating film 152 first. The interlayer insulating film 152 may be a lamination of a plurality of films comprising various materials.

(11) Formation of Third Wiring Layer

A titanium (Ti) film having a thickness of 100 nm, an aluminum (Al) film having a thickness of 500 nm, and a Ti film having a thickness of 100 nm are formed by sputtering and the like in this order. Subsequently, a resist film is patterned in a desired pattern by a photolithography method so that a resist mask is formed. Then, a Ti/Al/Ti metal lamination is patterned by dry etching to form a third wiring layer 163. As a metal constituting the third wiring layer 163, Al—Si alloy may also be used instead of Al. In the present case, Al is used for lower resistance of the wirings. However, in the case where high thermal resistance is required and increase in resistance is acceptable to some extent (in the case of short wiring structure, for example), the materials of the first wiring layer 161 (Ta, Mo, MoW, W, TaN and the like) may be used as the material of the third wiring layer 163.

(12) Formation of Organic Insulating Film

A photosensitive acrylic resin film having a thickness of 1 to 3 μm (preferably 2 to 3 μm) is formed by a spin coat method so that an organic insulating film is formed on the display region of the TFT substrate 111. Exemplary organic insulating film may include non-photosensitive resin films such as a non-photosensitive acrylic resin film, and a film comprising a (non-)photosensitive polyalkylsiloxane resin, a (non-)photosensitive polysilazane resin, a (non-)photosensitive polyimide resin, or a (non-)photosensitive parellin resin. Exemplary materials of the organic insulating film may also include methyl-containing polysiloxane (MSQ) materials and porous MSQ materials. In this case, a photosensitive resin such as a naphthoquinone diazido type UV curable resin having a thickness of 1 to 5 μm (preferably 2 to 3 μm) is applied to the entire surface of the substrate 121 by a spin coat method and the like to form an organic insulating film. The organic insulating film is exposed through a photo mask having a desired shading pattern and then etched (developed) so that the organic insulating film is removed from the region where the contact holes are to be formed. Subsequently, baking of the organic insulating film is carried out (for example, at 200° C. for 30 minutes). This treatment smooths the shape of the openings (holes) of the organic insulating film 51, so that the aspect ratio of the contact holes is reduced. In addition, ashing (detachment) is not needed in removing contact portions (portions to be contact holes) of the organic insulating film first.

(13) Formation of Transparent Conductive Layer

An ITO (indium tin oxide) film and/or IZO (indium zinc oxide) film having a thickness of 50 to 200 nm (preferably 100 to 150 nm) is formed by a sputtering method, and then, the film is patterned in a desired pattern. In this manner, a transparent conductive layer 164 is formed. In the display region of the TFT substrate 111, pixel electrodes each corresponding to a pixel are formed in a matrix pattern. Then, an alignment film is applied in the display region and the alignment treatment is carried out thereon. Accordingly, the TFT substrate 111 is completed.

Each of the external connection terminals 141, 142, and 143 may comprise a single layer of the transparent conductive layer 164. However, from the standpoint of reducing the electrical resistance, each of the external connection terminals 141, 142, and 143 is preferably a lamination of the transparent conductive layer 164 as a topmost conductive layer and the third wiring layer that is a conductive layer that is a second conductive layer from the top. In a single-layered structure comprising only a topmost conductive layer, each external connection terminals 141, 142, or 143 is likely to have a high sheet resistance as the topmost conductive layer is normally a transparent conductive film such as an ITO film. In contrast, a lamination structure comprising a topmost conductive layer and a lower conductive layer having lower resistance is expected to allow reduction in sheet resistance of each external connection terminals 141, 142, or 143. In the case where a second conductive layer from the top is removed to produce a lamination structure comprising a topmost conductive layer and a conductive layer that is a third conductive layer from the top (second wiring layer 162 in the present embodiment), the third conductive layer may have a surface damaged by dry etching to increase contact resistance between the third conductive layer and the topmost conductive layer, resulting in increase in terminal resistance. Accordingly, from the standpoint of reducing the terminal resistance of each external connection terminal 141, 142, or 143, the third wiring layer 163 (second conductive layer from the top) is left below the transparent conductive layer 164 (topmost conductive layer).

(14) Panel Fabrication

Bonding of the TFT substrate 111 and the CF substrate, injection of liquid crystal materials, and attachment of a polarizing plate are sequentially carried out to produce a liquid crystal display panel. Injection of liquid crystal materials is carried out by one drop filling, vacuum injection, or the like. Vacuum injection is carried out by injecting liquid crystal materials through a liquid-crystal inlet provided in a part of a sealing material used to bond the TFT substrate 111 and the CF substrate and then sealing the liquid crystal inlet with a UV curable resin and the like.

The liquid crystal mode of the liquid crystal display panel is not particularly limited and examples thereof include TN (Twisted Nematic) mode, IPS (In Plane Switching) mode, VA (Vertical Alignment) mode, VATN (Vertical Alignment Twisted Nematic) mode, and PSA (Polymer Sustained Alignment) mode. The liquid crystal display panel may be a multi-domain panel in which a pixel has a plurality of domains. Further, the liquid crystal display panel may be a transmissive type, reflective type, or semi-transmissive (reflective-transmissive) type. The driving system of the liquid crystal display panel may be changed to a simple matrix type.

(15) Attachment of Rigid FPC and IC Chip

The rigid FPC 170 and the IC chip 175 are respectively thermocompressed to the TF substrate 111 by interposing an ACF (anisotropic conductive film) 180 comprising an adhesive component 182 (e.g. thermosetting resins such as thermosetting epoxy resins) in which conductive beads 181 are dispersed.

Assembly of the liquid crystal display panel and a back light unit completes the liquid crystal display device 100 of the present embodiment.

(Embodiment 2)

Figures 1, 3:
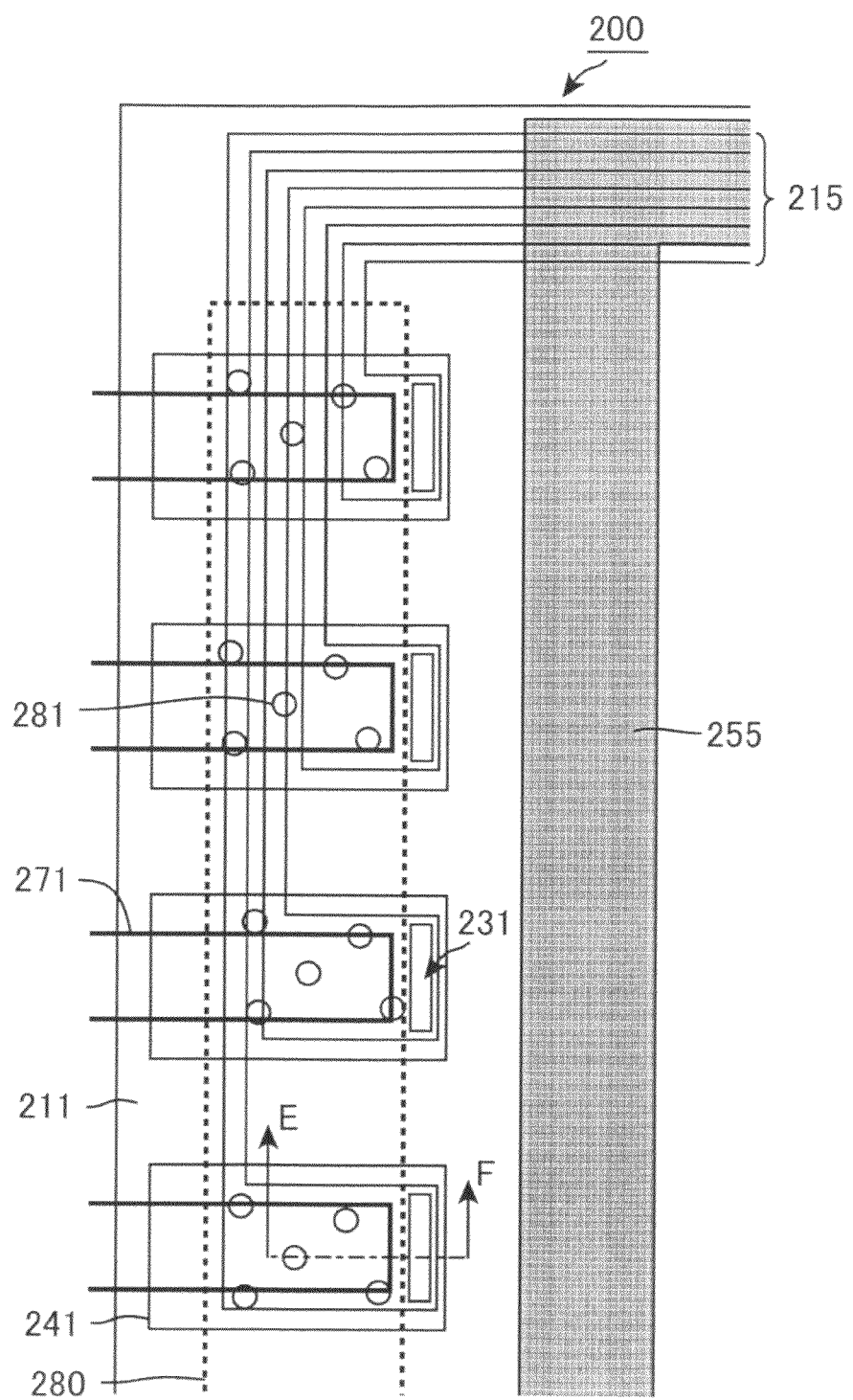
Figures 2, 3:
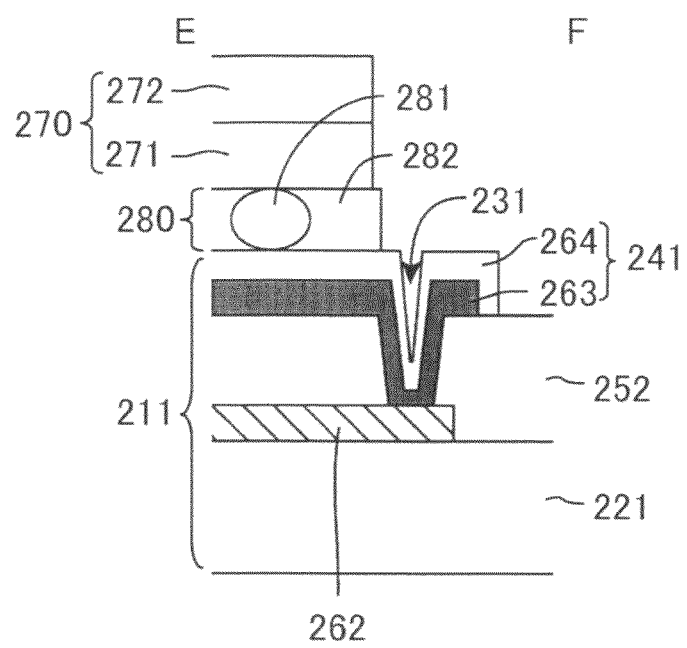

FIG. 3-1 is a schematic plan view illustrating a configuration of a frame region in a liquid crystal display device of Embodiment 2. FIG. 3-2 is a schematic cross-sectional view illustrating a configuration of the frame region in the liquid crystal display device of Embodiment 2 and is a cross-sectional view taken along E-F line in FIG. 3-1.

As illustrated in FIGS. 3-1 and 3-2, a liquid crystal display device 200 of the present embodiment has a configuration in which a TFT substrate 211 as a substrate for display device and a rigid FPC 270 as an external connection component are connected by an ACF 280 in the frame region.

In addition to the TFT substrate 211, the liquid crystal display device 200 further comprises a CF substrate positioned opposite to the TFT substrate 211. The CF substrate comprises, on the insulating substrate, (1) a black matrix comprising a shading material and color filters of red, green, and blue, (2) an overcoat layer, (3) a common electrode comprising a transparent conductive film, and (4) an alignment film, in this order from the side of the insulating substrate. The TFT substrate 211 and the CF substrate are sealed at the periphery by a sealing material 255 in a frame shape and the gap therebetween is filled with a liquid crystal material. On the TFT substrate 211, the rigid FPC 270 is positioned in a region other than the region where the TFT substrate 211 is opposed to the CF substrate.

The rigid FPC 270 comprises a plurality of wirings 271 running alongside each other on a base 272. The plurality of wirings 271 function as connection terminals (connecting portions) of the rigid FPC 270. The rigid FPC 270 carries electronic components such as various chips included in a liquid crystal controller, a power supply IC and the like, a resistor, and a condenser.

The TFT substrate 211 comprises a plurality of external connection terminals 241 which are corresponding to the plurality of wirings 271 of the rigid FPC 270 and aligned alongside each other.

An ACF 280 is provided so as to cover external connection terminals 241. The external connection terminals 241 are connected to the wirings 271 of the rigid FPC 270 via conductive beads (conductive particles) 281 that are conductive members in the ACF 280.

Each external connection terminal 241 is connected through a contact hole 231 provided in the interlayer insulating film 252 formed in a layer below the external connection terminal 241, to a wiring connecting portion positioned at one end of a common wiring 215 that is a lower wiring formed in a layer below the interlayer insulating film 252. Each common wiring 215 extends from the point under the external connection terminal 241 along the periphery of the TFT substrate 211 to another portion of the frame region of the TFT substrate 211 where no external connection terminal 241 is provided. Accordingly, the common wirings 215 are connected to the elements mounted on the TFT substrate 211, such as a semiconductor element, a capacitor, and a resistor. The semiconductor element is normally a transistor, more specifically a TFT. Each common wiring 215 is connected to two or more elements, such as a semiconductor element, a capacitor, and a resistor, to supply a common signal and electricity thereto. In this manner, a signal and electricity are supplied from the rigid FPC 270 to each element on the TFT substrate 211, such as a semiconductor element, a capacitor, and a resistor.

The contact holes 231 are provided collinearly (along a line in parallel with the running direction of the common wirings 215) in positions corresponding to the ends of the external connection terminals 241 positioned on the inner side of the TFT substrate 211. The contact holes 231 do not overlap with both the ACF 280 and the wiring 271 of the rigid FPC 170. In other words, the contact holes 231 are arranged in a region other than the region where the wirings 271 and the ACF 280 overlap with each other. Accordingly, each external connection terminal 241 is connected to any of the common wirings 215 in a region other than the region where the wiring 271 and the ACF 280 overlap with each other. Namely, the external connection terminal 241 has a portion connecting with the wiring 271 of the rigid FPC 270 (portion contacting with the conductive beads 281) and a portion connecting with the common wiring 215 (portion contacting with the wiring connecting portion of the common wiring 215) separately. The portion connecting with the common wiring 215 is positioned not to overlap with both the wirings 271 of the rigid FPC 270 and the ACF 280.

The contact holes 231 are provided between the ACF 280 and the sealing material 255, more specifically between a region where the wirings 271 of the rigid FPC 270 and the ACF 280 overlap with each other and the sealing material 255.

The external connection terminals 241 are arranged along the region where the ACF 180 is positioned. The common wirings 215 below the external connection terminals 241 are running alongside each other in a direction mainly along with the array direction of the external connection terminals 241. The common wirings 215 are bent in the vicinity of their ends on one side toward the same side (direction towards the inner side of the TFT substrate 211 and orthogonal to the running direction of the common wirings 215; horizontal direction in FIG. 3-1) in order from the endmost wiring on the inner side of the TFT substrate 211. The wiring connecting portions contacting with the external connection terminals 241 are provided at portions beyond the bent portions of the wirings. Accordingly, each common wiring 215 has an L-shape in a plan view in the vicinity of one end portion.

In the following, the cross-sectional configuration of the liquid crystal display device 200 is more specifically described.

As illustrated in FIG. 3-2, the frame region of the TFT substrate 211 has a laminated structure comprising a second wiring layer 262, an interlayer insulating film 252, a third wiring layer 263, a transparent conductive layer 264 sequentially laminated on an insulating substrate 221 in this order. It is to be noted that a basecoat film, a semiconductor layer, a gate insulating film, a first wiring layer, and an interlayer insulating film are sequentially laminated in this order below the second wiring layer 262 in the same manner as in Embodiment 1.

The second wiring layer 262 constitutes the common wirings 215. A lamination of the third wiring layer 263 and the transparent conductive layer 264 constitutes the external connection terminals 241. The TFT substrate 211 and the rigid FPC 270 are thermocompressed by interposing the ACF 280 so as to be connected to each other by conductive beads 281 in the ACF 280 and fixed to each other by an adhesive component 282 comprising a thermosetting resin in the ACF 280.

Further, pressure is applied via the conductive beads 281 during the thermocompression to the external connection terminals 241 and their corresponding wirings 271 of the rigid FPC 270. Accordingly, if a contact hole 231 is provided in a region where the pressure is applied (region where the wirings 271 overlap with the conductive beads 281), the pressure is also applied to the external connection terminals 241 in normally-thin portions of the films in the contact hole 231. As a result, the external connection terminals 241 in this part may be collapsed during the thermocompression, leading to a connection failure. Especially in a case where the conductive beads 281 in the ACF 280 are used as conductive materials, the external connection terminals 241 may be cut in the shape of a ring so that a connection failure occurs frequently.

In contrast, the contact hole 231 is positioned in a region other than the region where the wirings 271 of the rigid FPC 270 overlap with the conductive beads 281 in a plan view of the TFT substrate 211 in the liquid crystal display device 200. Accordingly, it is possible to avoid pressure application to the external connection terminal 241 in the thin portion of the film in the contact hole 231 during thermocompression as the conductive beads 181 contact only with comparatively-thick portion on the top surface of the external connection terminal 241. As a result, it is possible to prevent a contact failure between the TFT substrate 211 and the rigid FPC 270, which may be caused by a collapse of the external connection terminal 241.

The present technical level of mass production allows reduction in linewidth and spacing (line and space) of the wiring groups such as the common wirings 215 to about 2 μm by dry etching employed in microfabrication. When photolithography is carried out by using the interlayer insulating film 252 provided on the wiring groups as a photosensitive organic insulating film, line and space of about 4 μm is the limit of microfabrication. Accordingly, in order to form the contact holes 231 for connecting the wiring groups with the external connection terminals 241 on such wiring groups, the actual size of the contact holes 231 needs to be larger than the width of a wiring in the wiring groups from the standpoint of position control accuracy and microprocessing accuracy of the contact holes 231. Therefore, simple arrangement of the contact holes 231 on the running region of the wiring groups may increase the distance between the adjacent wirings, leading to decrease in number of the wirings which can be arranged below the external connection terminal 231.

In contrast, in the liquid crystal display device 200, the common wirings 215 are running alongside each other crossing the external connection terminals 241 and bent toward the same side with respect to the running direction (direction crossing the external connection terminals 241) in order from the endmost wiring, in a plan view of the TFT substrate 211, and contact holes 231 are connected to portions beyond the bent portions (wiring connecting portions) of the common wirings 215. Accordingly, arrangement of the contact hole 231 outside the running regions of the common wirings 215 can keep the line and space of the common wirings 215 as narrow as possible even in the case where the interlayer insulating film 252 is a photosensitive organic insulating film. In addition, it is possible to keep the line and space as narrow as possible regardless of the number of the common wirings 215. Consequently, reduction in area of the frame region is achieved as it is not necessary to reduce the number of the wirings which can be arranged below the external connection terminals 241.

Additionally, since the contact holes 231 are provided collinearly (more preferably, along a line in parallel with the running direction of the common wirings 215) in a plan view of the TFT substrate 211, it is possible to make the area of the entire region where the contact holes 231 are arranged narrower while ensuring the appropriate size of the respective contact holes 231 in comparison with the case where the contact holes 231 are arranged at random, for example, in a zigzag pattern. Namely, more reduction in area of the frame region is achieved.

Each contact hole 231 is provided between the region where the wirings 271 of the rigid FPC 270 and the ACF 280 overlap with each other and the sealing material 255, in a plan view of the TFT substrate 211. The region between the ACF 280 and the sealing material 255 is designed as a marginal region needed for the registration accuracy of the ACF attachment and seal arrangement accuracy. The pressure is normally not applied to the region during the thermocompression. Accordingly, arrangement of the contact hole 231 in this marginal region limits increase in area of the frame region at the minimum while preventing a contact failure.

Here, the planar shape of the contact holes 231 is not particularly limited. Additionally, each contact hole 231 may be divided into a plurality of holes.

The liquid crystal display device of Embodiment 2 can be produced by the same production method of the liquid crystal display device of Embodiment 1. Therefore, description of the production method is omitted here.

In the following, a modified example of the present embodiment is described.

Figure 4:
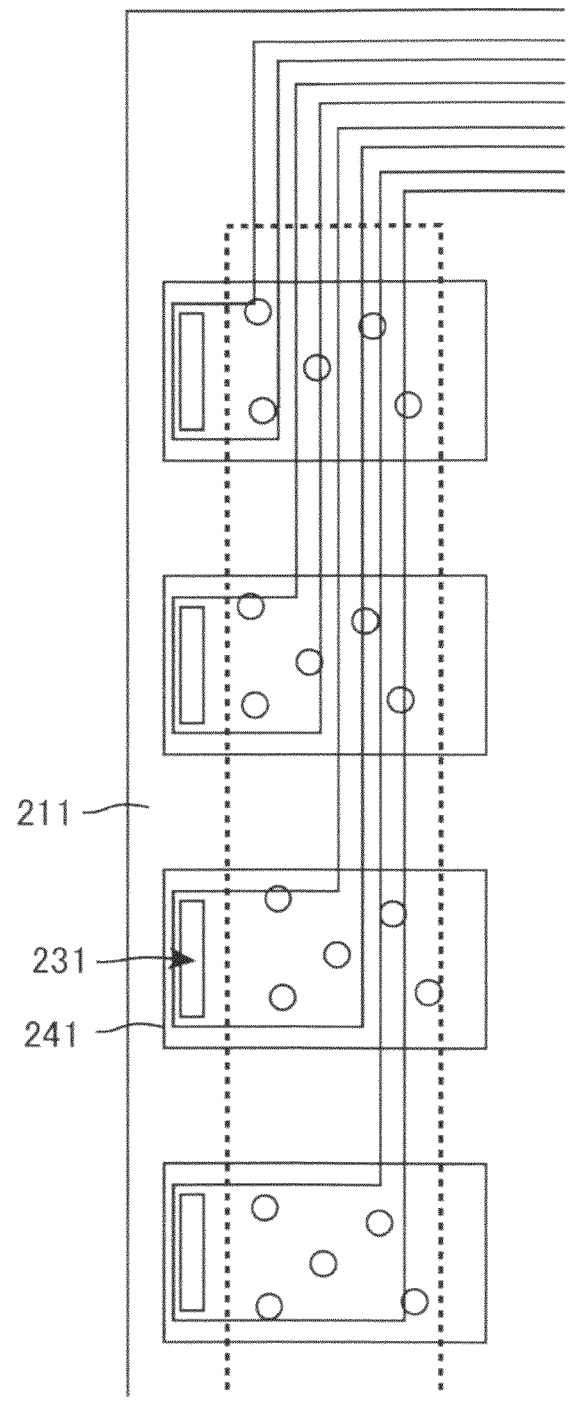
FIG. 4 is a schematic plan view illustrating a modified example of the configuration of the frame region in the liquid crystal display device of Embodiment 2.

FIG. 4 is a schematic plan view illustrating a modified example of the configuration of the frame region in the liquid crystal display device of Embodiment 2. The contact holes 231 may be positioned in an outer region beyond the external connection terminals 241 (on the peripheral side of the TFT substrate 211) as illustrated in FIG. 4.

Figures 1, 5:
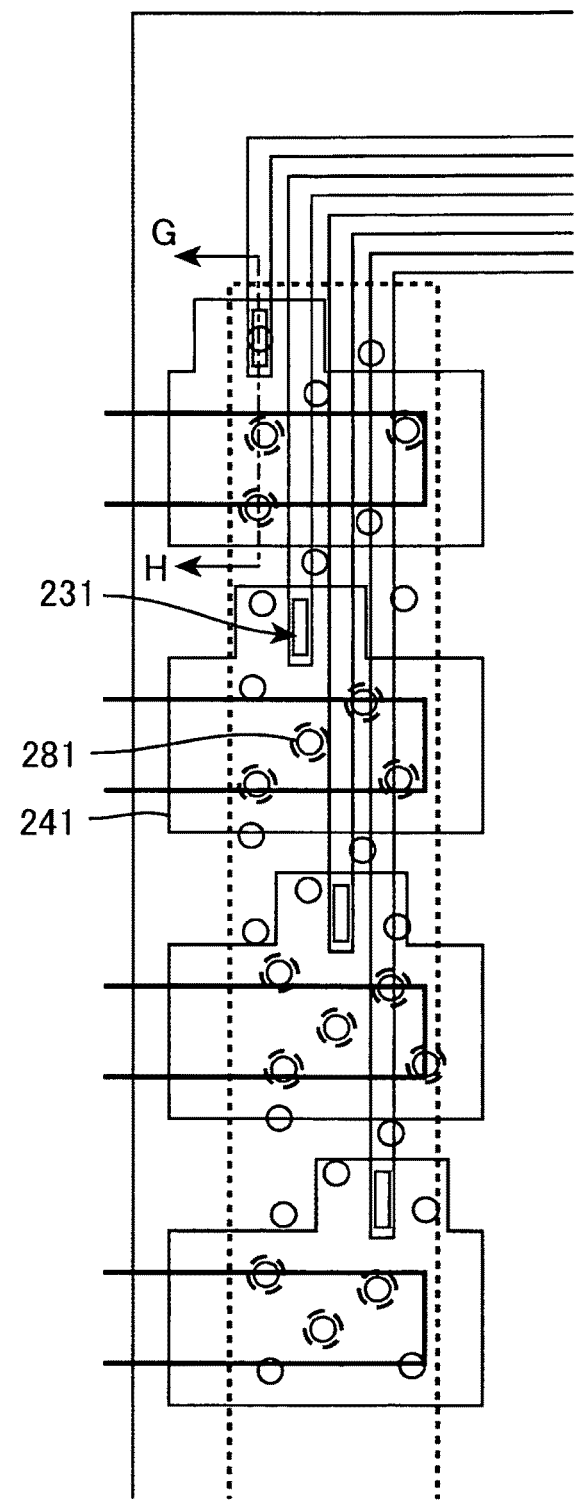
Figures 2, 5:
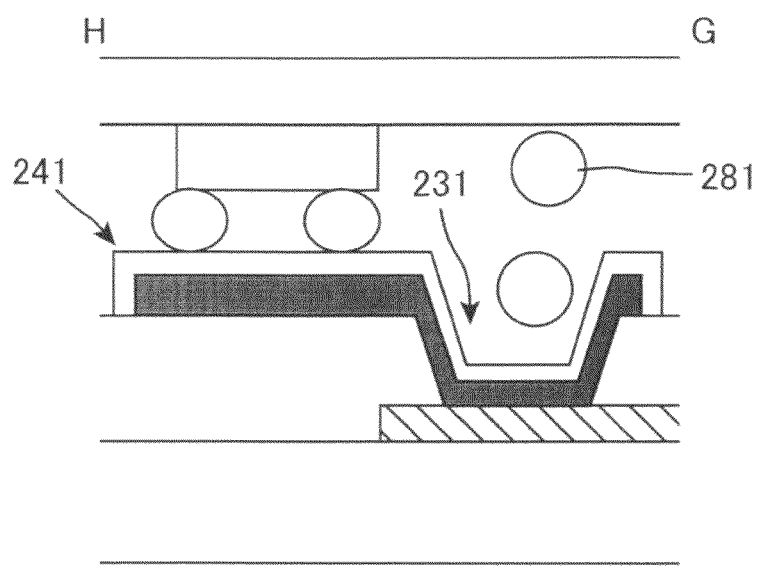

FIG. 5-1 is a schematic plan view illustrating a modified example of the configuration of the frame region in the liquid crystal display device of Embodiment 2. FIG. 5-2 is a schematic cross-sectional view illustrating the modified example of a configuration of the frame region in the liquid crystal display device of Embodiment 2 and is a cross-sectional view taken along G-H line in FIG. 5-1. In FIG. 5-1, conductive beads 281 subject to the pressure are circled by dashed lines. The contact holes 231 may be positioned between two adjacent wirings 271 of the rigid FPC 270 as illustrated in FIGS. 5-1 and 5-2. Even in such a case, it is possible to avoid pressure application to the external connection terminals 241 in comparatively-thin portions of the films in the contact holes 231 during thermocompression.

Figures 1, 6:
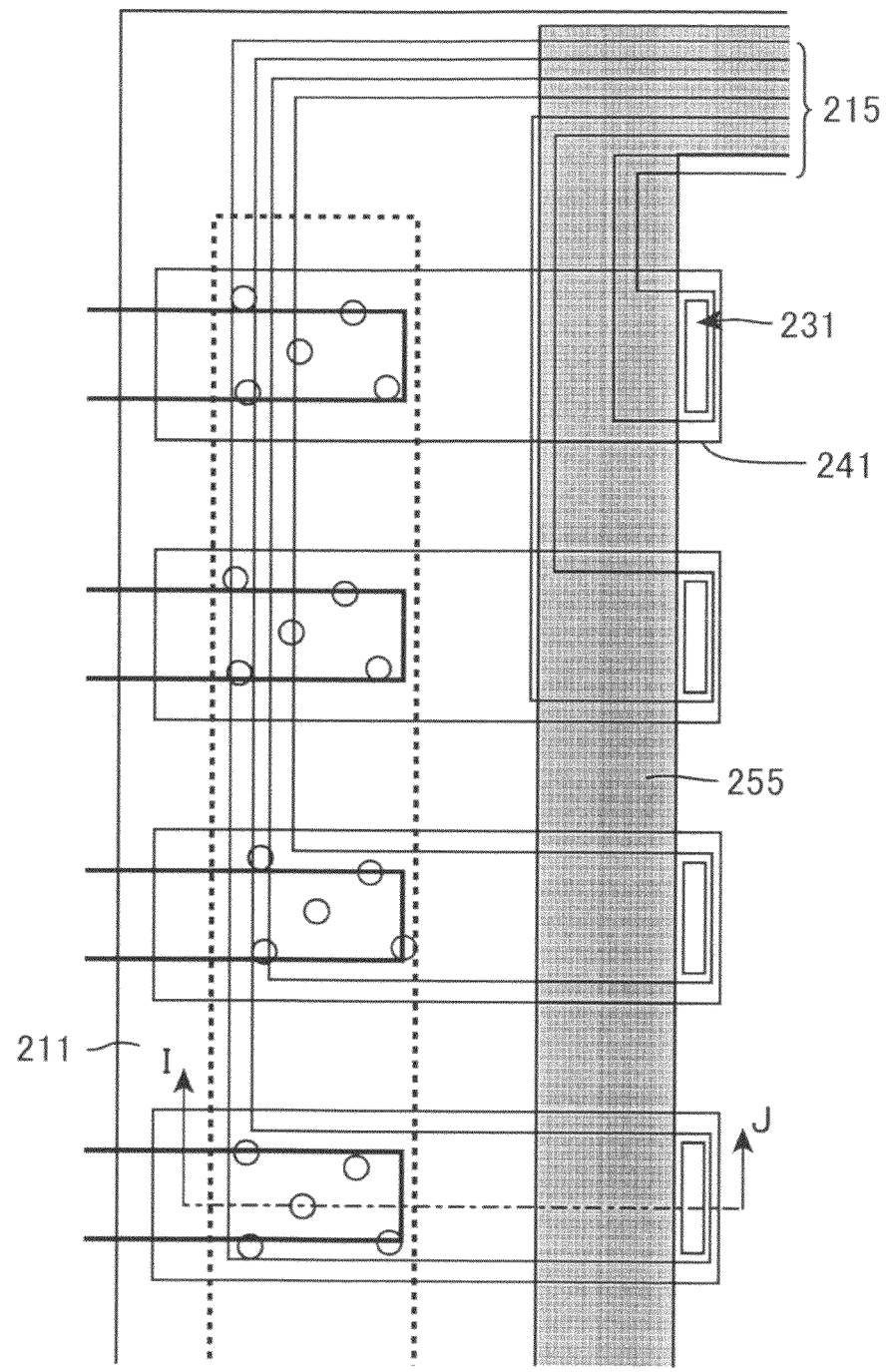
Figures 2, 6:
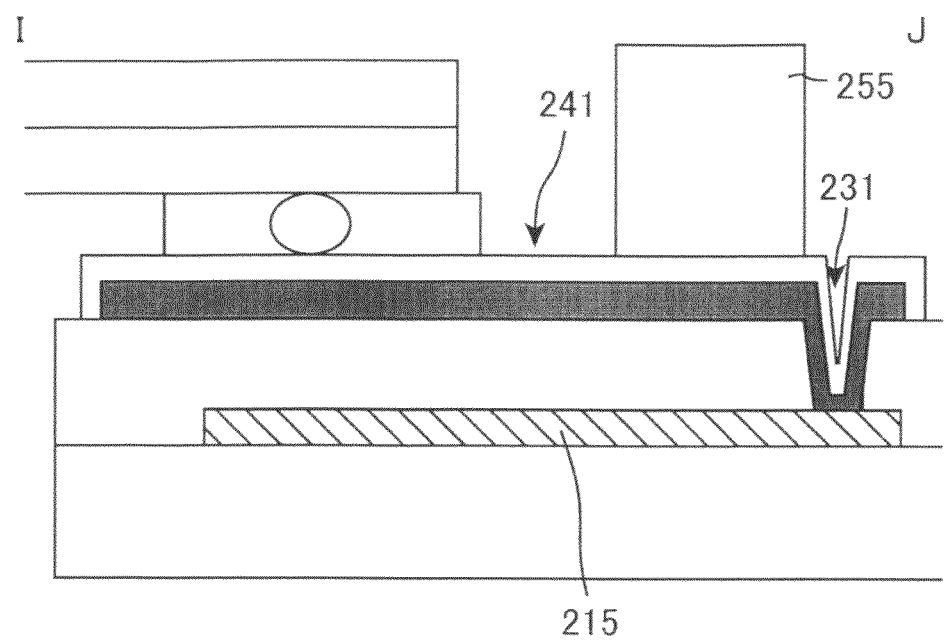

FIG. 6-1 is a schematic plan view illustrating a modified example of the configuration of the frame region in the liquid crystal display device of Embodiment 2. FIG. 6-2 is a schematic cross-sectional view illustrating the modified example of the configuration of the frame region in the liquid crystal display device of Embodiment 2 and is a cross-sectional view taken along I-J line in FIG. 6-1. The contact holes 231 may be positioned further toward an inner side of the TFT substrate 211 (toward the center of the TFT substrate 211) than the sealing material 255 in a plan view of the TFT substrate 211, as illustrated in FIGS. 5-1 and 5-2. Namely, the contact holes 231 are positioned in the liquid crystal layer in a plan view of the TFT substrate 211. This improves the reliability of the contacting portions of the external connection terminals 241 and the common wirings 215.

Figures 1, 7:
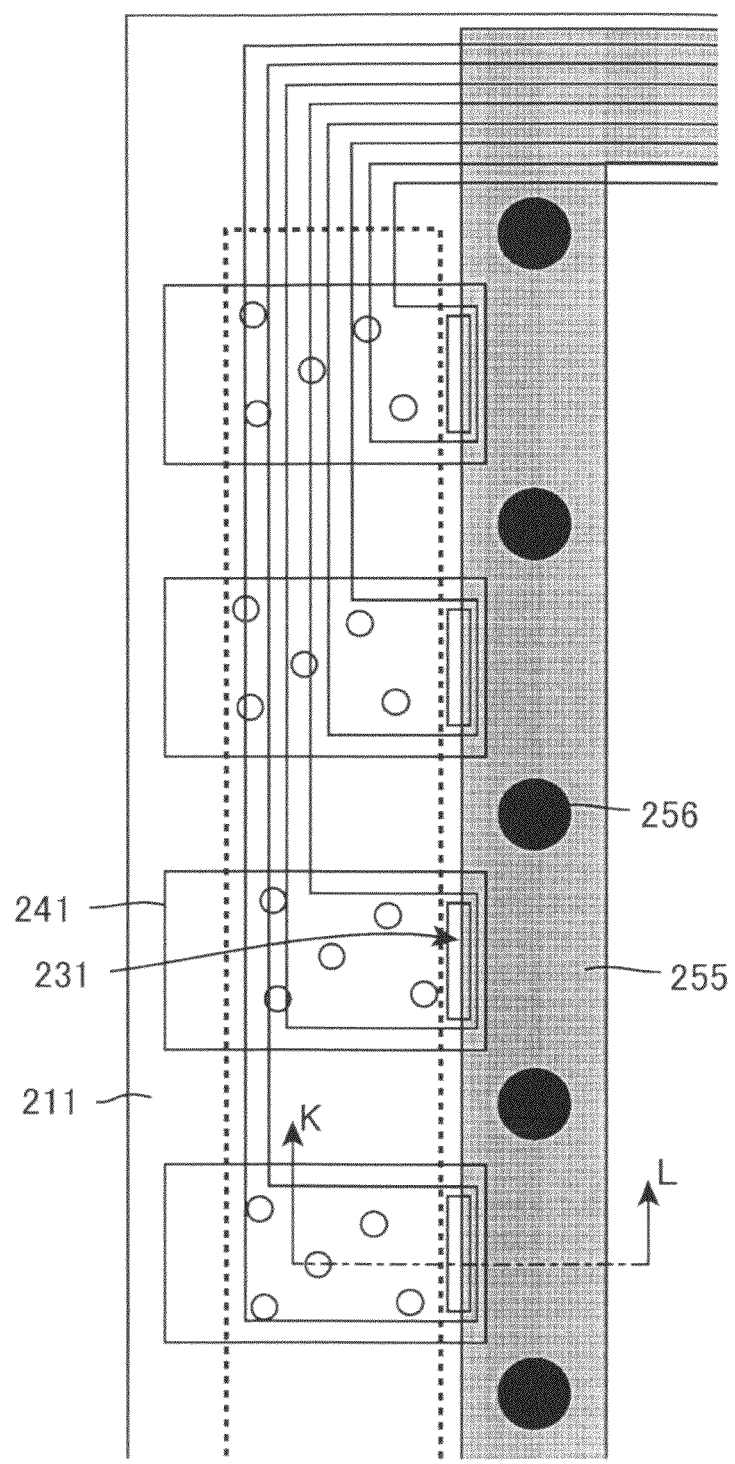
Figures 2, 7:
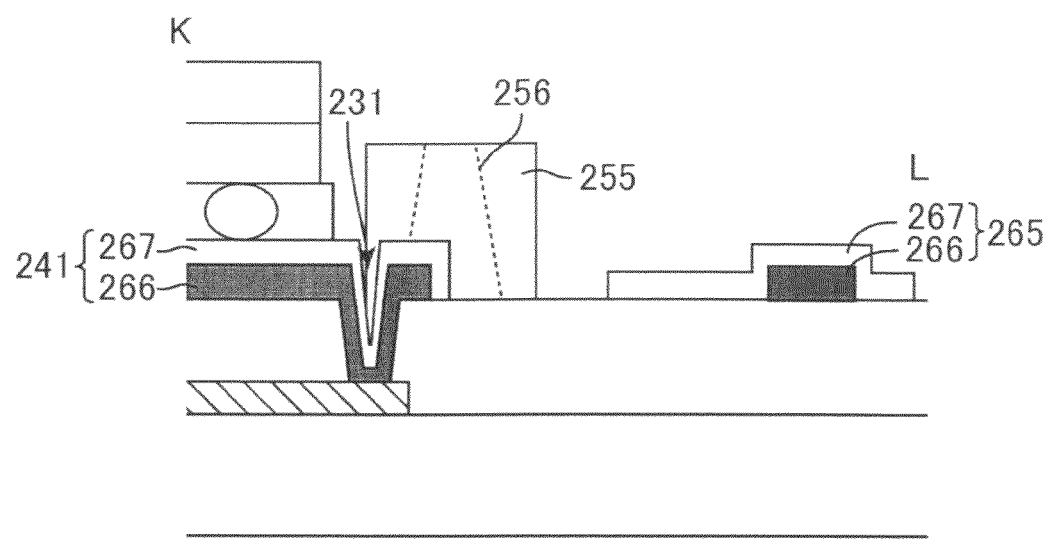

FIG. 7-1 is a schematic plan view illustrating a modified example of the configuration of the frame region in the liquid crystal display device of Embodiment 2. FIG. 7-2 is a schematic cross-sectional view illustrating the modified example of the configuration of the frame region in the liquid crystal display device of the embodiment 2 and is a cross-sectional view taken along K-L line in FIG. 7-1. The contact holes 231 may overlap with the sealing material 255 in a plan view of the TFT substrate 211 and the TFT substrate 211 may have photo spacers 256 formed in the sealing material 255 as illustrated in FIGS. 7-1 and 7-2. The sealing material 255 may contain glass fibers as a spacer. In such a case, arrangement of the contact holes 231 overlapping with the sealing material 255 for the purpose of reducing the area of the frame region and improving the reliability may cause a damage to the external connection terminals 255 in thin portions of the films in the contact holes 231 by the glass fibers, resulting in defects such as a contact failure. On the other hand, it is easy to precisely control the position of the photo spacers 256 as they are formed by patterning of a photosensitive resin or non-photosensitive resin with use of a photolithography method. Accordingly, use of the photo spacers 256 as spacers allows the arrangement of the contact holes 231 not overlapping with the photo spacers 256 even in a case where the sealing material 255 overlaps the contact holes 231. Consequently, the present modified example allows reduction in area of the frame region and improvement in reliability while preventing defects such as a contact failure.

In the present modified example, all or a part of the contact holes 231 may overlap with the sealing material 255. The photo spacers 256 may be formed on the CF substrate.

The liquid crystal display device of the present modified example is a semi-transmissive type and has reflective-transmissive type pixel electrodes 265 having the same configuration as the external connection terminals 241 formed therein. The pixel electrode 265 is a lamination of a lower conductive film 266 doubling as a reflective conductive film constituting a reflective potion and an upper conductive film 267 doubling as a transparent conductive film constituting a transparent portion. The lower conductive film 266 is formed by patterning an aluminum (Al) film having a thickness of 350 nm formed by a sputtering method, with use of a photolithography method. The upper conductive film 267 is formed by patterning an IZO film having a thickness of 100 nm formed by a sputtering method, with use of a photolithography method.

Figures 1, 8:
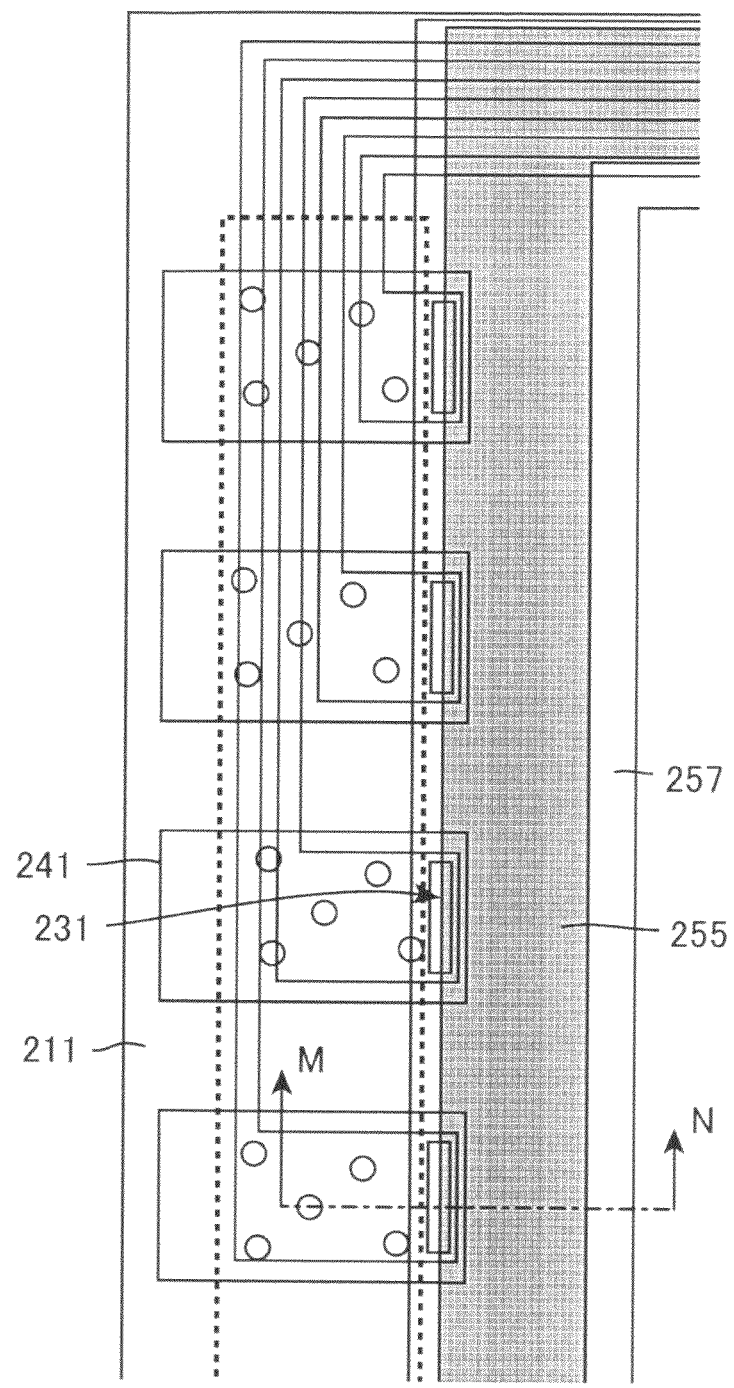
Figures 2, 8:
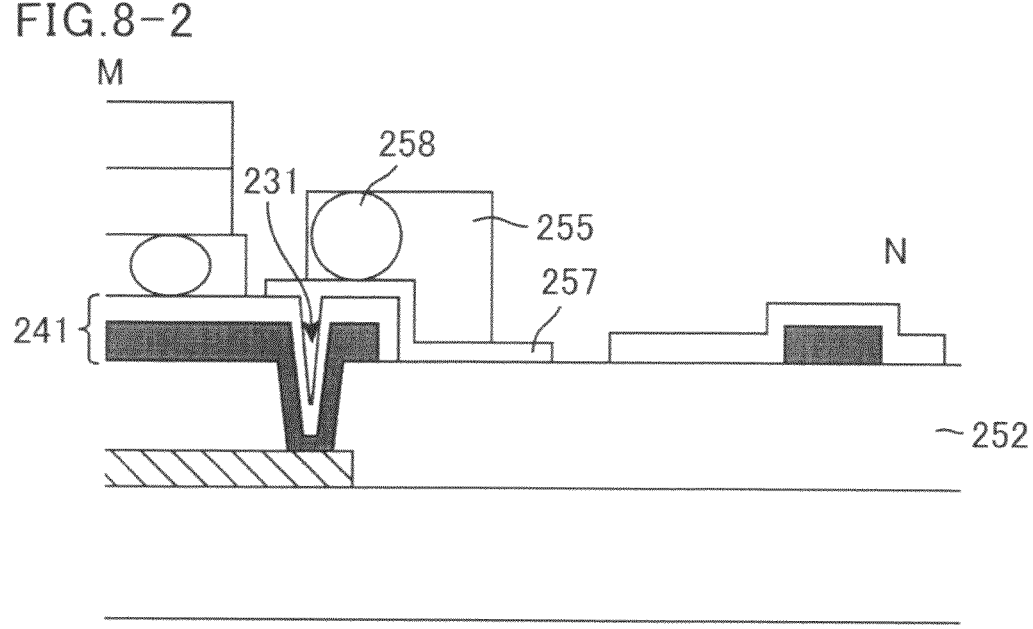

FIG. 8-1 is a schematic cross-sectional view illustrating a modified example of the configuration of the frame region in the liquid crystal display device of Embodiment 2. FIG. 8-2 is a schematic cross-sectional view illustrating the modified example of the configuration of the frame region in the liquid crystal display device of the embodiment 2 and is a cross-sectional view taken along M-N line in FIG. 8-1. As illustrated in FIGS. 8-1 and 8-2, the contact holes 231 may overlap with the sealing material 255 in a plan view of the TFT substrate 211 and the TFT substrate 211 may have an insulating film 257 below the sealing material 255, more specifically, at least in regions where the contact holes 231 overlap with the sealing material 255. In addition, the sealing material 255 contains glass fibers 258 as spacers. This prevents defects such as a contact failure which may be caused by damage to the external connection terminals 241 in thin portions of the films in the contact holes 231 by the glass fibers 258 even in a case where the sealing material 255 is arranged to overlap the contact holes 231. Namely, this embodiment also allows reduction in area of the frame region and improvement in reliability while preventing defects such as a contact failure.

In the case of forming the interlayer insulating film 252 from an organic insulating film, formation of the insulating film 257 by a CVD method may damage the organic insulating film. Therefore, the insulating film 257 is preferably formed by a method not causing damage to the interlayer insulating film, such as a sputtering method. Examples of the material for the insulating film 257 include silicon oxide ($SiO_2$). The insulating film 257 may be formed by patterning a $SiO_2$ film formed by a sputtering method, with use of a photolithography method.

The insulating film 257 is arranged below substantially the entire sealing material 255 except for the contact portions with the opposite substrate. This prevents deterioration in display quality which is caused by uneven cell thickness due to difference in level formed by the insulating film 257.

In the present modified example, all or a part of the contact holes 231 may overlap with the sealing material 255.

Figure 9:
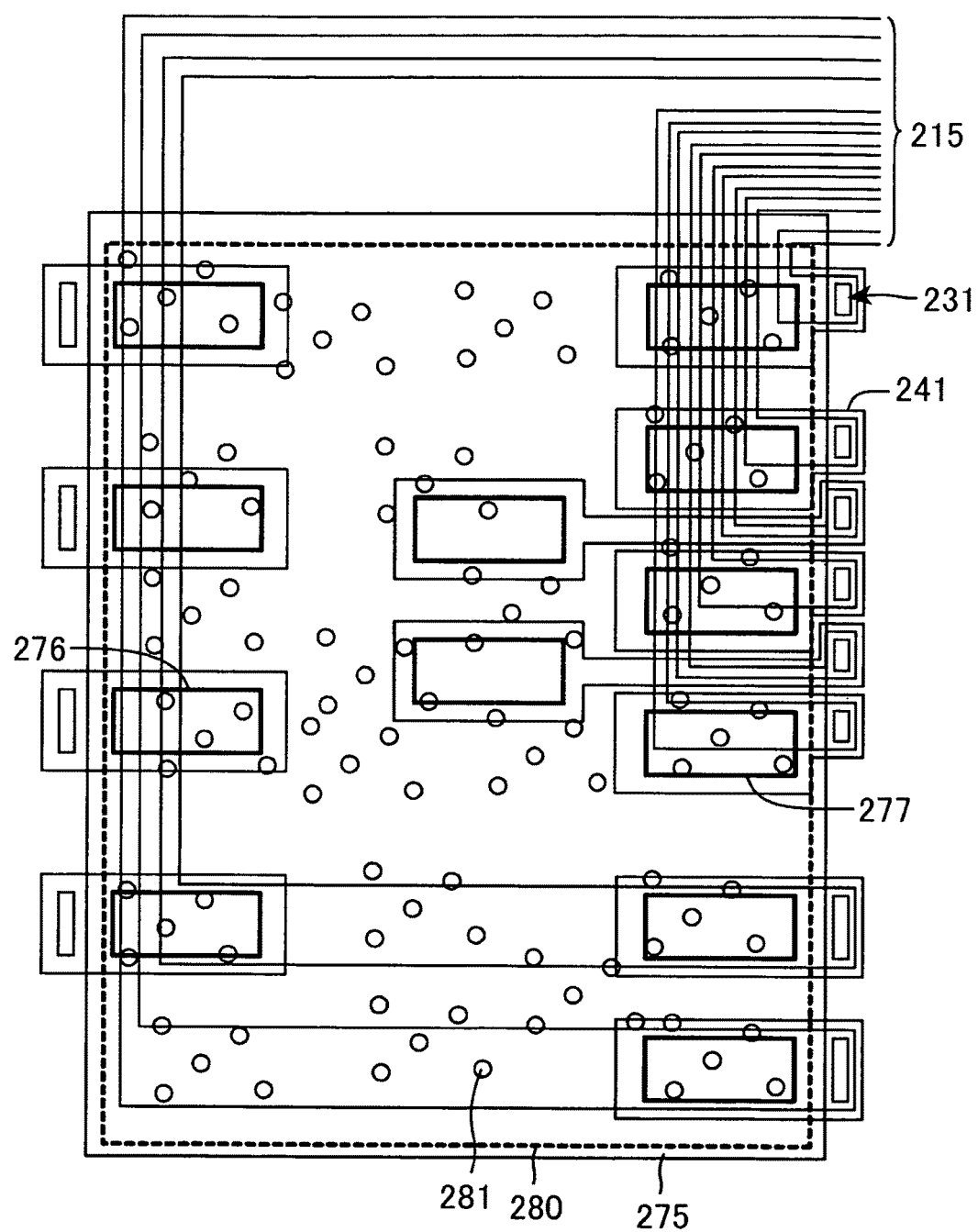
FIG. 9 is a schematic plan view illustrating a modified example of the structure of the frame region in the liquid crystal display device of the embodiment 2.
Figure 10:
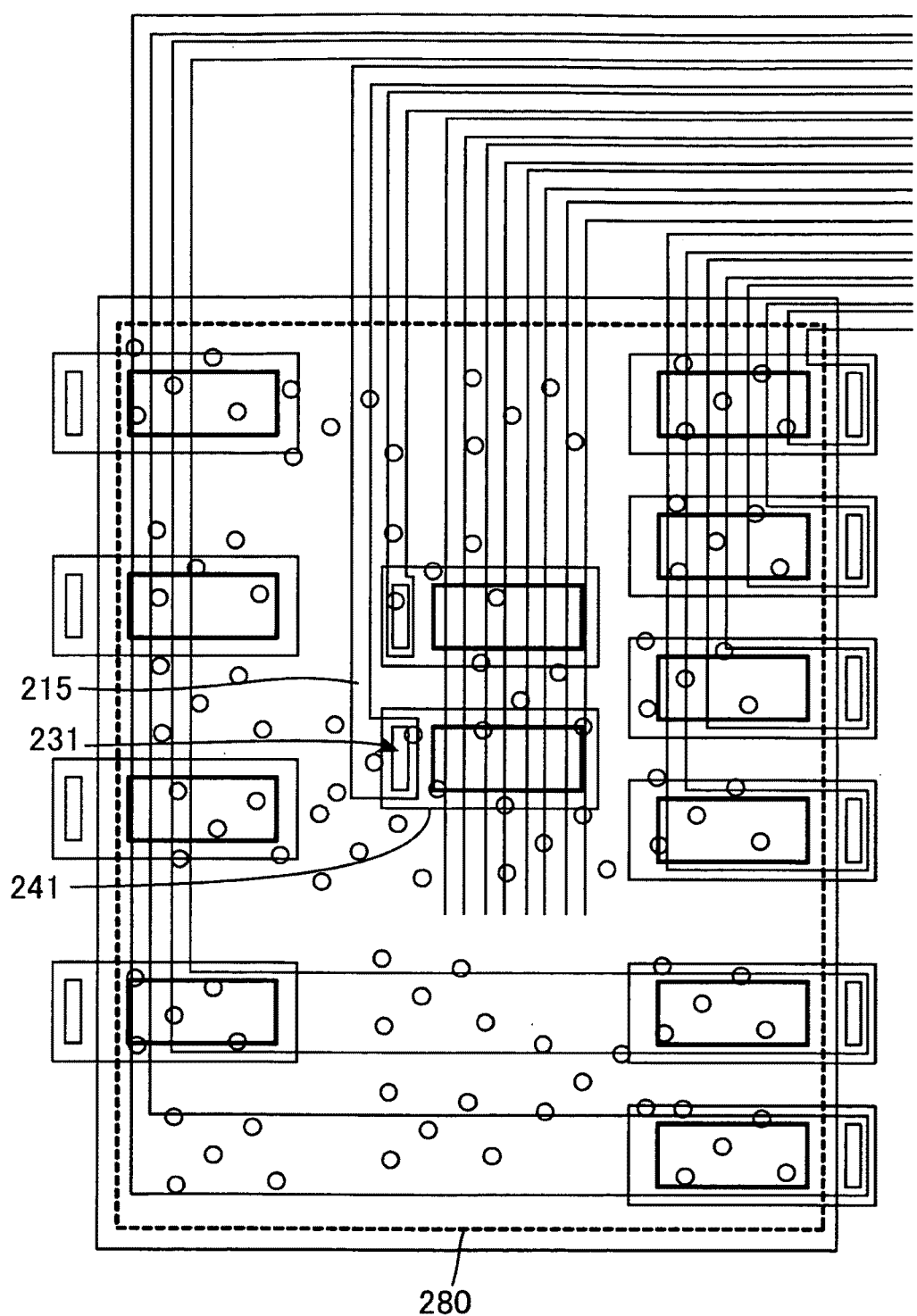
FIG. 10 is a schematic plan view illustrating a modified example of the configuration of the frame region in the liquid crystal display device of Embodiment 2.
Figure 11:
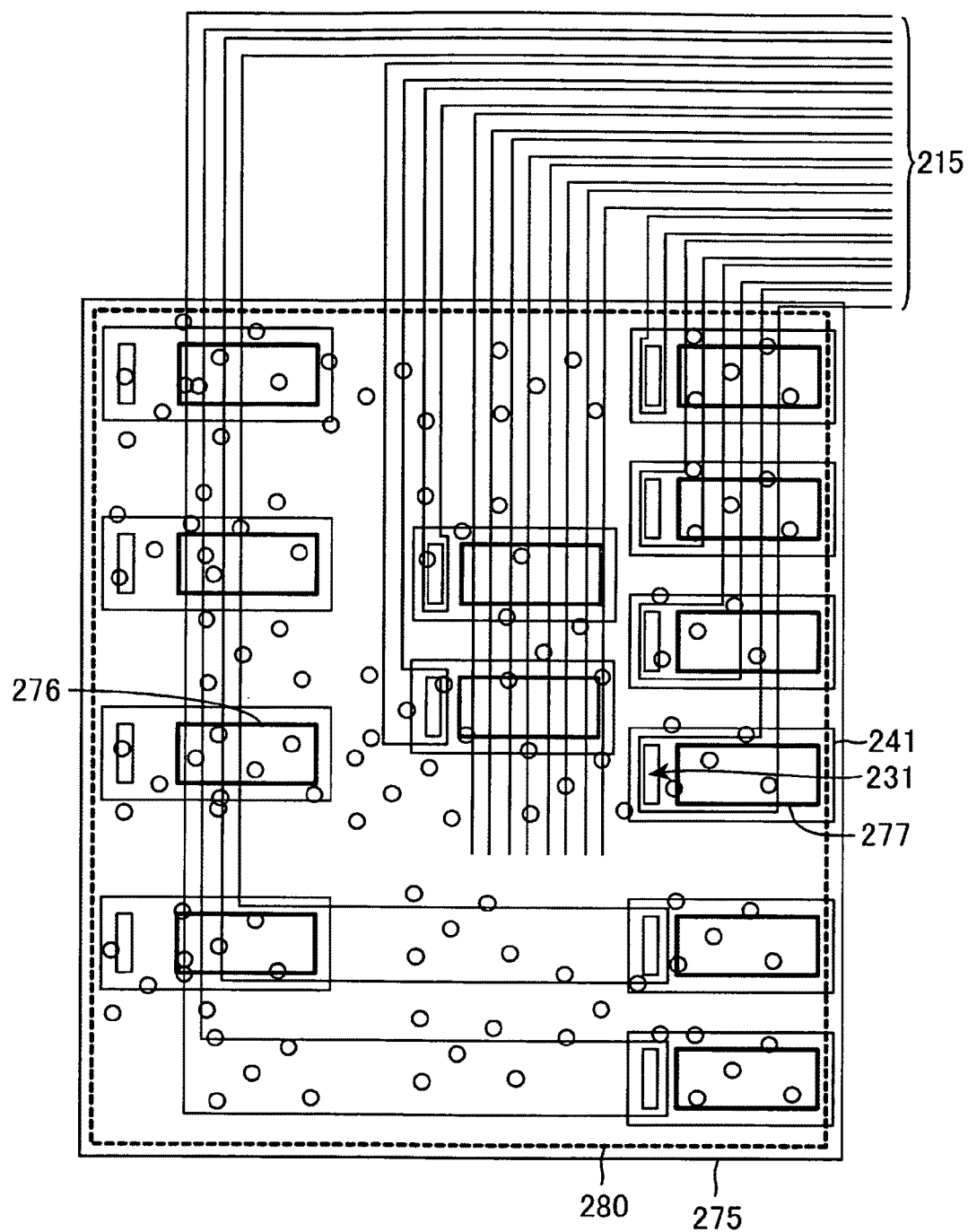
FIG. 11 is a schematic plan view illustrating a modified example of the configuration of the frame region in the liquid crystal display device of Embodiment 2.

FIGS. 9 to 11 are schematic plan views each illustrating a modified example of the configuration of the frame region in the liquid crystal display device of Embodiment 2. As illustrated in FIG. 9, an IC chip 275 may be connected to the TFT substrate 211. The IC chip 275 has a signal input bump 276 and a signal output bump 277. The bumps 276 and 277 function as connection terminals (connecting portions) of the IC chip 275. The IC chip 275 is mounted, as a bare chip, on the TFT substrate 211, according to a COG (Chip on Glass) technique.

Each external connection terminal 241 is connected to the signal input bump 276 or the signal output bump 277 and is extending outside of the ACF 280. The external connection terminal 241 is then connected to a common wiring 215 through a contact hole 231 in a region not overlapping with the ACF 280. This also prevents pressure application to the external connection terminals 241 in thin portions of the films in the contact holes 231 during thermocompression.

The contact hole 231 should not overlap with both the signal input bump 276 or signal output bump 277 and the ACF 280. Therefore, as illustrated in FIG. 10, the external connection terminals 241 maybe connected to the common wirings 215 through the contact holes 231 overlapping only with the ACF 280.

As illustrated in FIG. 11, the contact holes 231 may be provided in regions other than the region where both the signal input bump 276 or the signal output bump 277 and the ACF 280 overlap with each other in the area overlapping with the IC chip 275. The external connection terminals 241 are connected to the common wirings 215 in this region. This allows arrangement of the external connection terminals 241 in the region overlapping with the IC chip 275, and therefore, further reduction in area of the frame region is achieved.

Figures 1, 16:
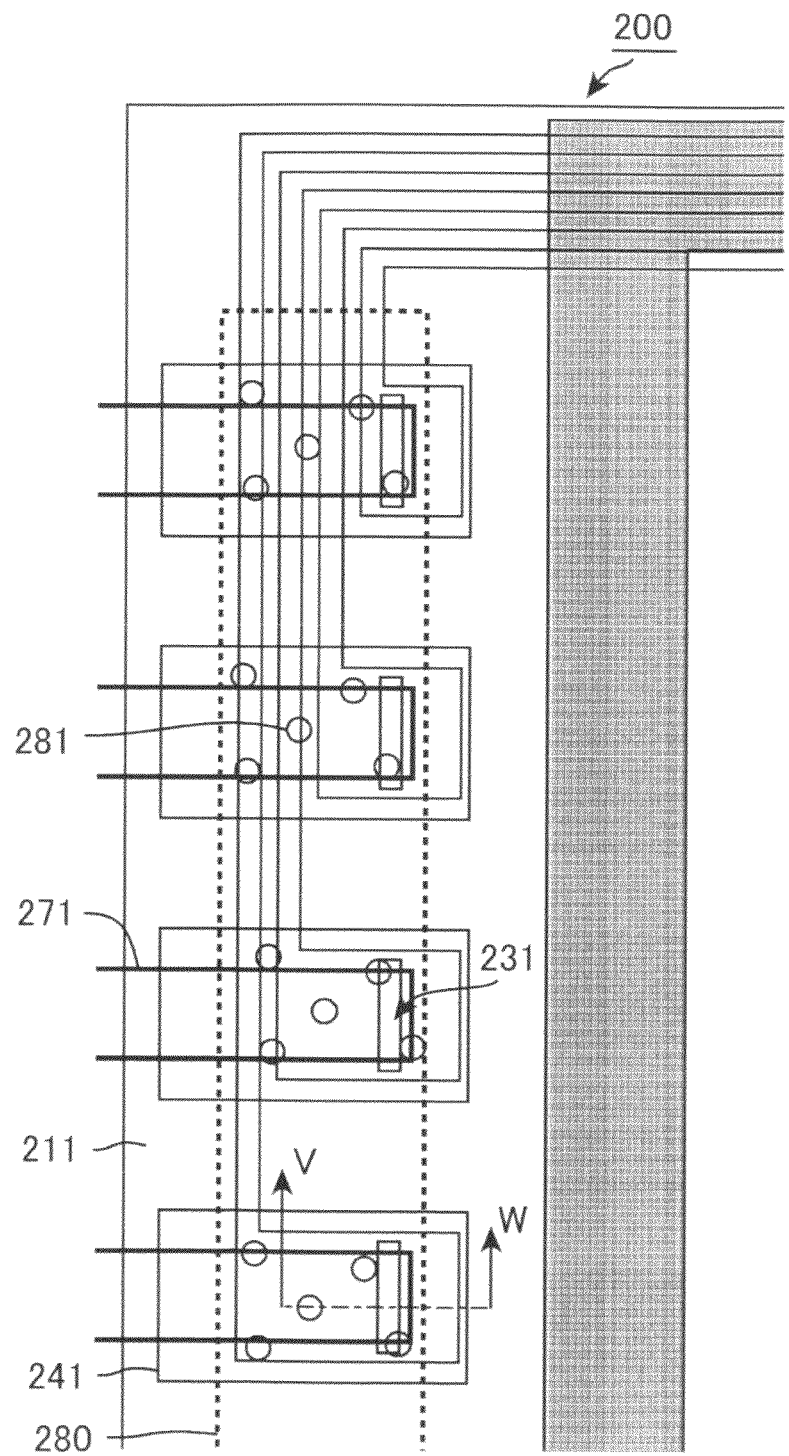
Figures 2, 16:
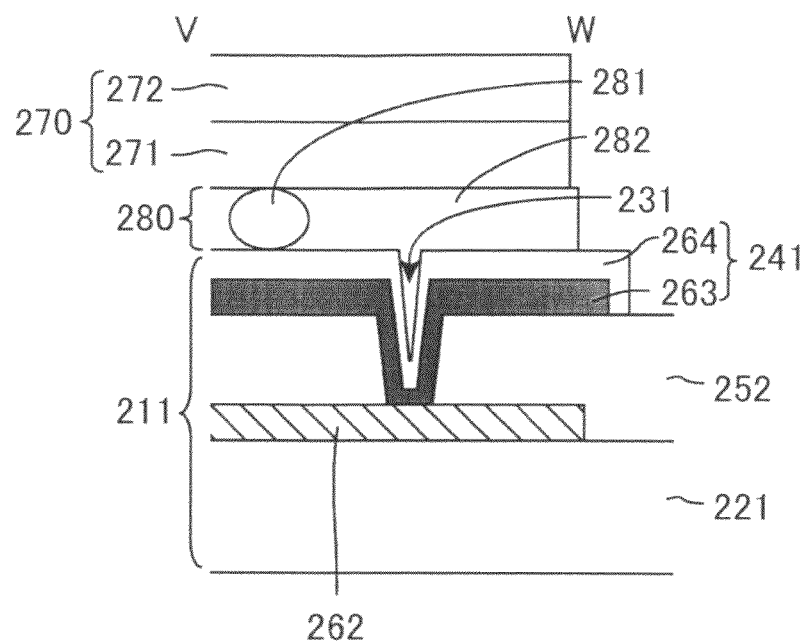

FIG. 16-1 is a schematic plan view illustrating a modified example of the configuration of the frame region in the liquid crystal display device of Embodiment 2. FIG. 16-2 is a schematic cross-sectional view illustrating the modified example of the configuration of the frame region in the liquid crystal display device of Embodiment 2 and is a cross-sectional view taken along V-W line in FIG. 16-1. In a case where it is not necessary to consider an influence of a contact failure of the TFT substrate 211 and a FPC substrate 270 due to thermocompression, the contact holes 231 may be positioned in a region where the wirings 271 of the FPC substrate 270 and the conductive beads 281 (ACF 280) overlap with each other in a plan view of the TFT substrate 211. This allows further reduction in area of the frame region.

(Embodiment 3)

Figure 12:
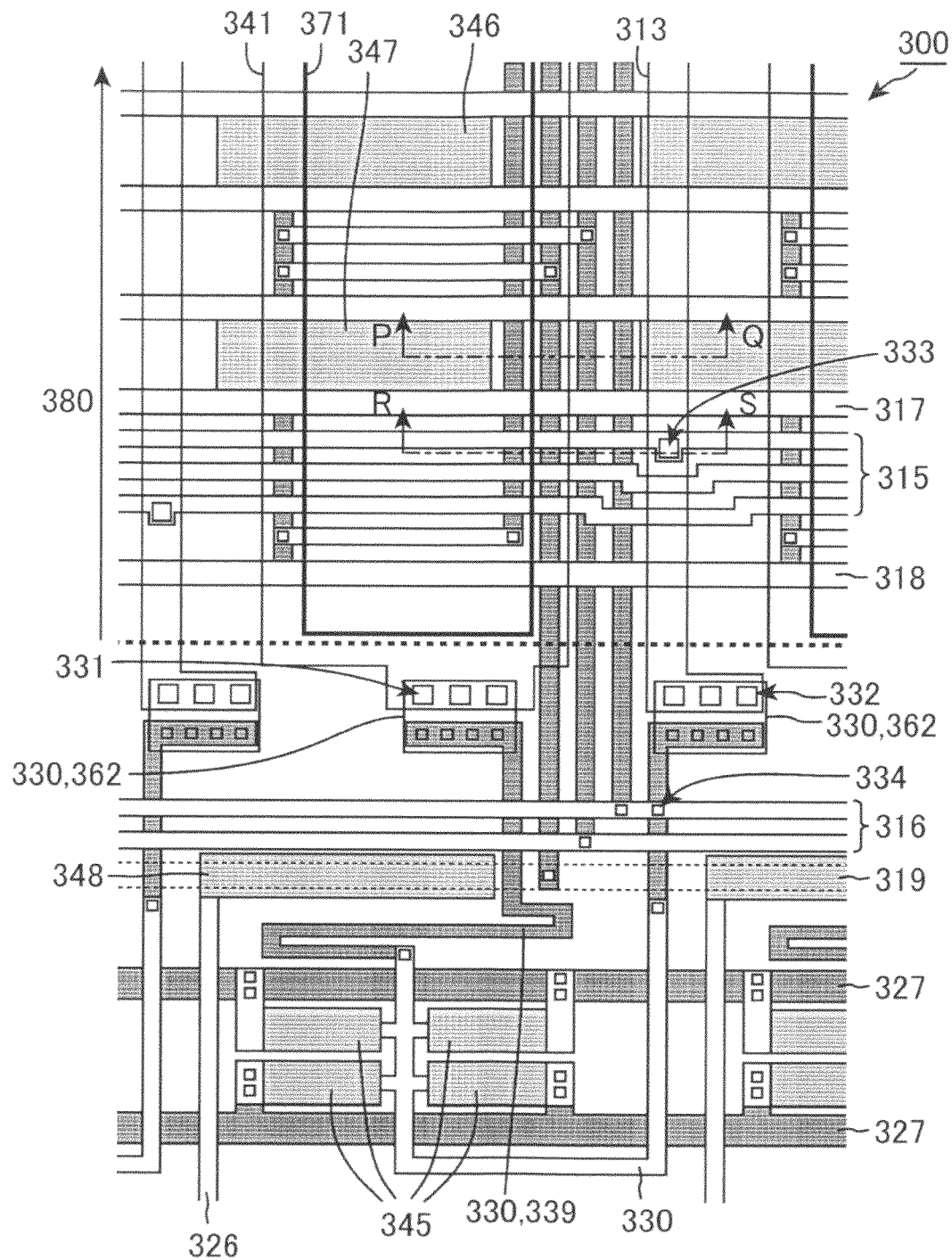
FIG. 12 is a schematic plan view illustrating a structure of a frame region in a liquid crystal display device of an embodiment 3.
Figure 13:
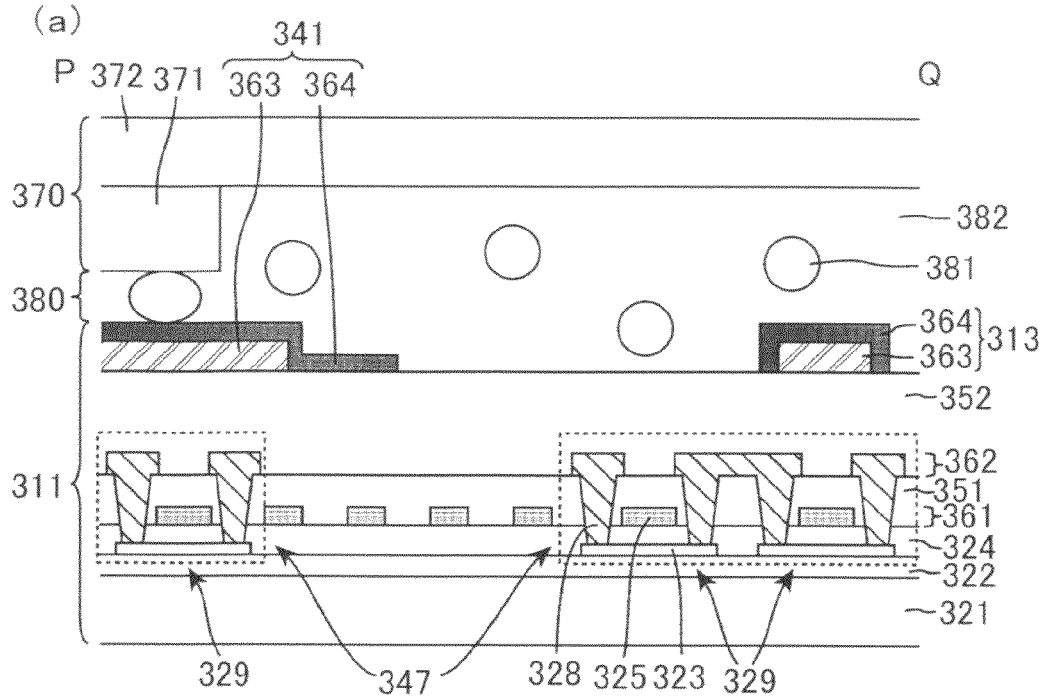
FIG. 13 are schematic cross-sectional views each illustrating the configuration of the liquid crystal display device of Embodiment 3.
Figure 13:
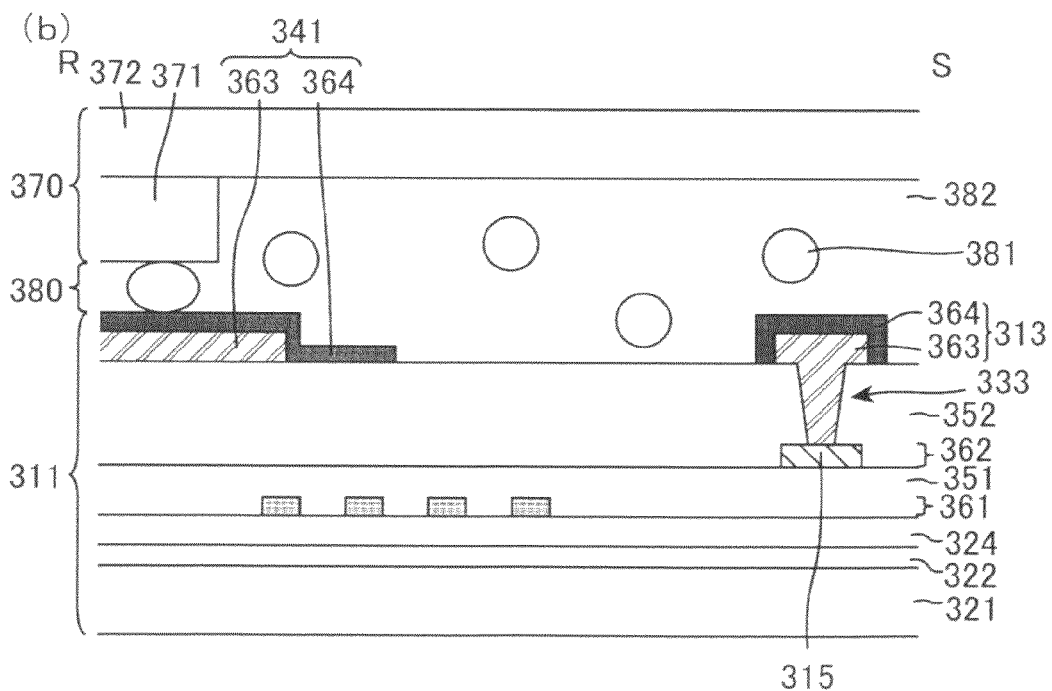

FIG. 12 is a schematic plan view illustrating a configuration of a frame region in a liquid crystal display device of Embodiment 3. FIG. 13 are schematic cross-sectional views each illustrating the configuration of the liquid crystal display device of Embodiment 3. FIG. 13(a) is a cross-sectional view taken along P-Q line in FIG. 12 and FIG. 13(b) is a cross-sectional view taken along R-S line in FIG. 12.

A liquid crystal display device 300 of the present embodiment has a configuration in which a TFT substrate 311 as a substrate for display device is connected to a rigid FPC 370 as an external connection component by an ACF 380 in the frame region as illustrated in FIGS. 12, 13(a), and 13(b).

The TFT substrate 311 has a lamination structure comprising a basecoat layer 322, a semiconductor layer 323, a gate insulating film 324, a first wiring layer 361, an interlayer insulating film 351, a second wiring layer 362, an interlayer insulating film 352, a third wiring layer 363, and a transparent conductive layer 364 sequentially laminated on an insulating substrate 321 in this order in the frame region as illustrated in FIGS. 13(a), and 13(b).

In addition to the TFT substrate 311, the liquid crystal display device 300 further comprises a CF substrate positioned opposite to the TFT substrate 311. The CF substrate comprises, on an insulating substrate, (1) a black matrix comprising a shading material and color filters of red, green, and blue, (2) an overcoat layer, (3) a common electrode comprising a transparent conductive film, and (4) an alignment film, in this order from the side of the insulating substrate. The TFT substrate 311 and the CF substrate are sealed at the periphery by a sealing material in a frame shape and the gap between the TFT substrate 311 and the CF substrate is filled with a liquid crystal material. On the TFT substrate 311, the rigid FPC 370 is positioned in an outer region beyond the region in which the TFT substrate 311 and the CF substrate are opposing to each other.

The rigid FPC 370 comprises a plurality of wirings 371 running alongside each other on a base 372. The plurality of wirings 371 function as connection terminals (connecting portions) of the rigid FPC 370. The rigid FPC 370 has electronic components such as various chips included in a liquid crystal controller, a power supply IC and the like, a resistor, and a condenser mounted thereon.

A plurality of external connection terminals 341 are aligned alongside each other on the TFT substrate 311 corresponding to the plurality of wirings 371 in the rigid FPC 370. Between two adjacent external connection terminals 341, an upper wiring 313 formed by the same layer as the external connection terminal 341 is provided. The upper wirings 313 are provided in a region not overlapping with the wirings 371 of the rigid FPC 370.

An ACF 380 covers the external connection terminals 341 (region above the thick dotted line in FIG. 12). The external connection terminals 341 are connected to the wirings 371 of the rigid FPC 370 via conductive beads (conductive particles) 381 as conductive members in the ACF 380.

The external connection terminal 341 and the upper wiring 313 are formed by using laminations each comprising a third wiring layer 363 and a transparent conductive layer 364, and are connected to each other via a routing wiring 330 provided outside of the region where the wiring 371 of the rigid FPC 370 and the ACF 380 overlap with each other. The routing wirings 330 are formed by the first wiring layer 361 and the second wiring layer 362. More specifically, the both ends of the routing wiring 330 are formed by the second wiring layer 362. One end of the routing wiring 330 is connected to the external connection terminal 341 formed on the interlayer insulating film 352 through a contact hole 331 provided in the interlayer insulating film 352. The other end of the routing wiring 330 is connected to the upper wiring 313 formed on the interlayer insulating film 352 through a contact hole 332 provided in the interlayer insulating film 352. In this manner, the both ends of the routing wiring 330 function as the wiring connecting portions.

The contact holes 331 are provided collinearly in positions corresponding to the ends of the external connection terminals 341 positioned at the inner side of the TFT substrate 311. Also, the contact holes 331 are positioned in a region not overlapping with the ACF 380. Further, the contact holes 331 are positioned in a region other than the region where the wirings 371 of the rigid FPC 371 and the ACF 380 overlap with each other. Each external connection terminal 341 is connected to any of the routing wirings 330 in a region other than the region where the wirings 371 and the ACF 380 overlap with each other. Namely, the external connection terminal 341 has a portion connecting with the wiring 371 of the rigid FPC 370 (portion contacting with the conductive beads 381) and a portion connecting with the routing wiring 330 (portion contacting with the wiring connecting part of the routing wiring 330) separately. The part connecting with the routing wiring 330 is positioned not to overlap with both the wiring 371 of the rigid FPC 370 and the ACF 380.

The contact holes 332 are provided collinearly in positions corresponding to the ends of the upper wirings 313 positioned at the inner side of the TFT substrate 311. Also, the contact holes 332 are positioned in a region not overlapping with the ACF 380. Further, the contact holes 332 are positioned in a region other than the region where the wirings 371 of the rigid FPC 371 and the ACF 380 overlap with each other. Each upper wiring 313 is connected to any of the routing wirings 330 in a region other than the region where the wiring 313 overlaps the wirings 371 and the ACF 380. Namely, the connecting part of the upper wiring 313 with the routing wiring 330 is positioned not to overlap both the wiring 371 and the ACF 380.

Each upper wiring 313 is connected through a contact hole 333 provided in the interlayer insulating film 352 to any of the wiring connecting portions of the common wirings 315 as 2.5 lower wirings formed in a layer below the interlayer insulating film 352. The common wirings 315 are arranged alongside each other along the periphery of the TFT substrate 311, namely along the array direction of the external connection terminals 341 (crosswise direction in FIG. 12). The common wirings 315 are running below the external connection terminals 341 in a direction across the external connection terminals 341. Then, the common wirings 315 are connected to the elements on the TFT substrate 311, such as a semiconductor element, a capacitor, and a resistor. The semiconductor element is normally a transistor, more specifically a TFT. The upper wirings 313 are substantially orthogonal to the common wirings 315 in a plan view of the TFT substrate 311. The common wirings 315 are signal wirings for transmitting signals and each of them are connected to two or more elements, such as a semiconductor element, a capacitor, and a resistor, to supply common signals. In this manner, various signals supplied from the rigid FPC 370 are transmitted to respective elements on the TFT substrate 311, such as a semiconductor element, a capacitor, and a resistor, via the external connection terminals 341, the routing wirings 330, the upper wirings 313, and the common wirings 315. Here, the common wirings 315 may be connected to a gate electrode of a TFT comprising a semiconductor layer, a gate insulating film, and a gate electrode laminated in this order.

The contact holes 333 are provided in regions overlapping with the ACF 380. However, the contact holes 333 are positioned in a region other than the region where both the wirings 371 of the rigid FPC 370 and the ACF 380 overlap with each other. Each upper wiring 313 is connected to any of the common wirings 315 in a region other than the region overlapping with the wirings 371 or the ACF 380. Namely, each upper wiring 313 has a portion connected to the common wirings 315 in a region not overlapping with both the wirings 371 of the rigid FPC 370 and the ACF 380.

The routing wirings 330 are connected to ESD (electrostatic discharge) protection circuits 345 provided on the inner side of the TFT substrate 311 than the external connection terminals 341. Further, each routing wiring 330 is connected through the contact hole 334 provided in the interlayer insulating film 352 to any of the common wirings 316 formed by the second wiring layer 362. Here, the ESD protection circuits 345 are connected to the common wirings 327 formed by the first wiring layer 361. The common wirings 327 connect respective ESD circuits to each other. The ESD protection circuits 345 are provided collinearly along a line in parallel with the common wirings such as the common wirings 315 and 316. The routing wirings 330 up to the connecting portions to the ESD protection circuits 345 are formed by the first wiring layer 361 and function as high-resistance regions 339.

In the region overlapping with the rigid FPC 370 in the TFT substrate 311, circuit blocks 346 and 347 each including a TFT 329 and a routing wiring are directly formed. Further, in that region, a circuit block 348 is also directly formed on the inner side of the TFT substrate 311 than the external connection terminals 341. A source driver, a gate driver, and a power supply circuit are formed in each of the circuit blocks 346, 347, and 348. The TFT 329 includes a semiconductor layer 323, a gate insulating film 324, and a gate electrode 325 comprising a first wiring layer 361 as illustrated in FIG. 13(a). A source drain wiring 328 comprising a second wiring layer 362 is connected through a contact hole penetrating the interlayer insulating film 351 and the gate insulating film 324 to the source drain region of the semiconductor layer 323.

A source line 326 formed by the second wiring layer 362 extends from the circuit block 348 for transmitting an image signal to each pixel. In addition, the TFT substrate 311 comprises common wirings 317 and 318 each formed by the second wiring layer 362 and functioning as a power line and a common wiring 319 formed by the third wiring layer 363 and functioning as a power line.

The TFT substrate 311 and the rigid FPC are thermocompressed by interposing the ACF 380. In this manner, they are connected to each other via conductive beads 381 in the ACF 380 and fixed to each other by an adhesive component 382 comprising a thermosetting resin in the ACF 380.

Further, pressure is applied via the conductive beads 381 during the thermocompression to the external connection terminals 341, and their corresponding wirings 371 of the rigid FPC 370. Accordingly, if the contact holes 331 are provided in regions where the pressure is applied (a region where the wirings 371 and the conductive beads 381 overlap with each other), the pressure is also applied to the external connection terminals in normally-thinner portions of the film in the contact holes 331. As a result, there may be a case where the external connection terminals 341 are collapsed in this region during the thermocompression, leading to a connection failure. Especially in a case where the conductive beads 381 in the ACF 380 are used as conductive members, the external connection terminals 341 may be cut in the shape of a ring so that a connection failure occurs frequently.

In contrast, the contact holes 331 are positioned in a region other than the region where the wirings 371 of the rigid FPC 370 overlap with the conductive beads 381 in a plan view of the TFT substrate 311 in the liquid crystal display device 300. Accordingly, it is possible to avoid pressure application to the external connection terminals 341 in the thin portions of the film in the contact holes 331 during thermocompression by contacting the conductive beads 381 only with comparatively-thick portions on the top surface of the external connection terminals 341. As a result, it is possible to prevent a contact failure between the TFT substrate 311 and the rigid FPC 370 which may be caused by a collapse of the external connection terminals 341.

The upper wirings 313 are provided in regions not overlapping with the wirings 371 of the rigid FPC 370 and positioned not to be directly connected to the wirings 371. Accordingly, even in a case where the conductive beads 381 (ACF 380) overlap with the upper wirings 313, the pressure is not applied to the upper wirings 313 in the thin portions of the film in the contact holes 333 via the conductive beads 381 during the thermocompression.

The upper wirings 313 are electrically connected to the external connection terminals 341 through the wiring connecting portions of the routing wirings 330 and overlap with the rigid FPC 370 in a plan view of the TFT substrate 311. In addition, the upper wirings 313 include conductive layers as same as the conductive layers constituting the external connection terminals 341. Further, the upper wirings 313 are connected through the contact holes 333 in the interlayer insulating film 352 to the common wirings 315 of the lower wirings. This connects various circuits such as the ESD protection circuits 345 to electrical paths between the external connection terminals 341 and the common wirings 315 (the routing wirings 330 in the present embodiment). Namely, it is possible to achieve reduction in area of the frame region and enhancement in functionality of the TFT substrate 311 at the same time. For example, arrangement of the ESD protection circuit 345 connected to the electrical path between the external connection terminal 341 and the upper wiring 313 supplies signals from the rigid FPC 370 to the semiconductor element on the TFT substrate 311, while preventing deterioration or collapse of the semiconductor element due to noise and/or electrostatic discharge from the rigid FPC 370.

In a case where the common wirings 315 as the lower wirings are connected to the gate electrodes of the TFT, deterioration or collapse of the semiconductor elements tends to occur as the thin gate insulating film is normally likely to be affected by noise and electrostatic discharge. Accordingly, the ESD protection circuits 345 can effectively prevent deterioration or collapse of the semiconductor elements, particularly in an embodiment where the common wirings 345 connected to the external connection terminals 341 and the upper wirings 313 are electrically connected to the gate electrodes of the TFT. Each common wiring 315 is connected to two or more semiconductor elements. The semiconductor element is normally a transistor, more specifically a TFT. The TFT connected to the common wiring 315 may be a top gate type TFT in which a semiconductor layer, a gate insulating film, and a gate electrode are laminated in this order from the side of the insulating substrate. Alternatively, the TFT connected to the common wiring 315 may be a back (bottom) gate type TFT in which a gate electrode, a gate insulating film, and a semiconductor layer are laminated in this order from the side of the insulating substrate.

Normally, it is not necessary to connect the ESD protection circuits to the common wirings 317, 318, and 319 functioning as power lines.

In the liquid crystal display device 300, the upper wirings 313 cross the common wirings 315. This connects each external connection terminal 341 to any of the common wirings 315 below the external connection terminal 341.

Further, in the liquid crystal display device 300, the upper wirings 313 are connected to the common wirings 315 and the routing wirings 330 are connected to the common wirings 316. Namely, at least two wirings of the common wirings 315 and 316 are connected to the electrical path between the external connection terminals 341 and the upper wirings 313. This allows transmission of signals having the same potentials to a plurality of the common wirings 315 and 316.

The routing wirings 330 in portions crossing the common wirings 316 are formed by the first wiring layer 361 formed in a layer below the common wirings 316. Namely, the common wirings 330 are formed over two or more wiring layers, and the external connection terminals 341 and the upper wirings 313 are connected to each other via two or more wiring layers. This enables use of the wirings 316 provided above the routing wirings 330, as the common wirings.

The planar shapes of the contact holes 331, 332, 333, and 334 are not particularly limited. Each of the contact holes 331 and 332 may be formed by a single hole and each of the contact holes 333 and 334 may be divided into a plurality of holes.

The ESD protection circuits 345 may be provided on the peripheral side of the TFT substrate 311 than the external connection terminals 341.

A liquid crystal display device of Embodiment 3 can be produced by the same production method of the liquid crystal display device of Embodiment 1. Therefore, description of the production method is omitted here.

The present invention has been mentioned in detail with reference to Embodiments 1 to 3. Each of the embodiments may be combined so long as the combination use is within the scope of the present invention.

While the present invention has been mentioned in the context of the liquid crystal display device in Embodiments 1 to 3, the present invention may be used in an organic EL display, a plasma display, an inorganic EL display, and the like. The present invention is suitably used especially in the display device having a display region in which a plurality of pixels are arrayed.

The circuit blocks (peripheral circuits) formed in the frame region are not particularly limited, and may be circuits such as a buffer circuit, digital-to-analog converter circuit (DAC circuit), shift register, sampling memory, or the like, in addition to a driver circuit including a circuit such as a transmission gate, a latching circuit, a timing generator, an inverter by power supply circuit and the like.

The external connection members are not particularly limited provided that they can be combined with a display device. Examples thereof include active elements, passive elements, assemblies comprising passive elements integrated therein, and wiring substrates (circuit substrates). Examples of the active elements include semiconductor elements such as semiconductor integrated circuits (IC chips), large-scale integrated circuits (LSI chip). Examples of the passive elements include resistors, LEDs (Light Emitting Diode), condensers, and sensors. The wiring substrate is an electric component comprising a wiring provided on and/or in an insulating substrate (base). Examples thereof include printed circuit boards, such as PWBs (Printing Wiring Board) and FPC boards, and TCPs (Tape Carrier Package). Here, the PWB may be a PCB (Printed Circuit Board).

The conductive members are not particularly limited provided that they can connect a substrate for display device such as a TFT substrate to an external connection component. Examples thereof include solder, in addition to the conductive particles (conductive beads) contained in anisotropic conductive materials such as anisotropic conductive films and anisotropic conductive pastes.

(Comparative Embodiment 1)

Figures 1, 14:
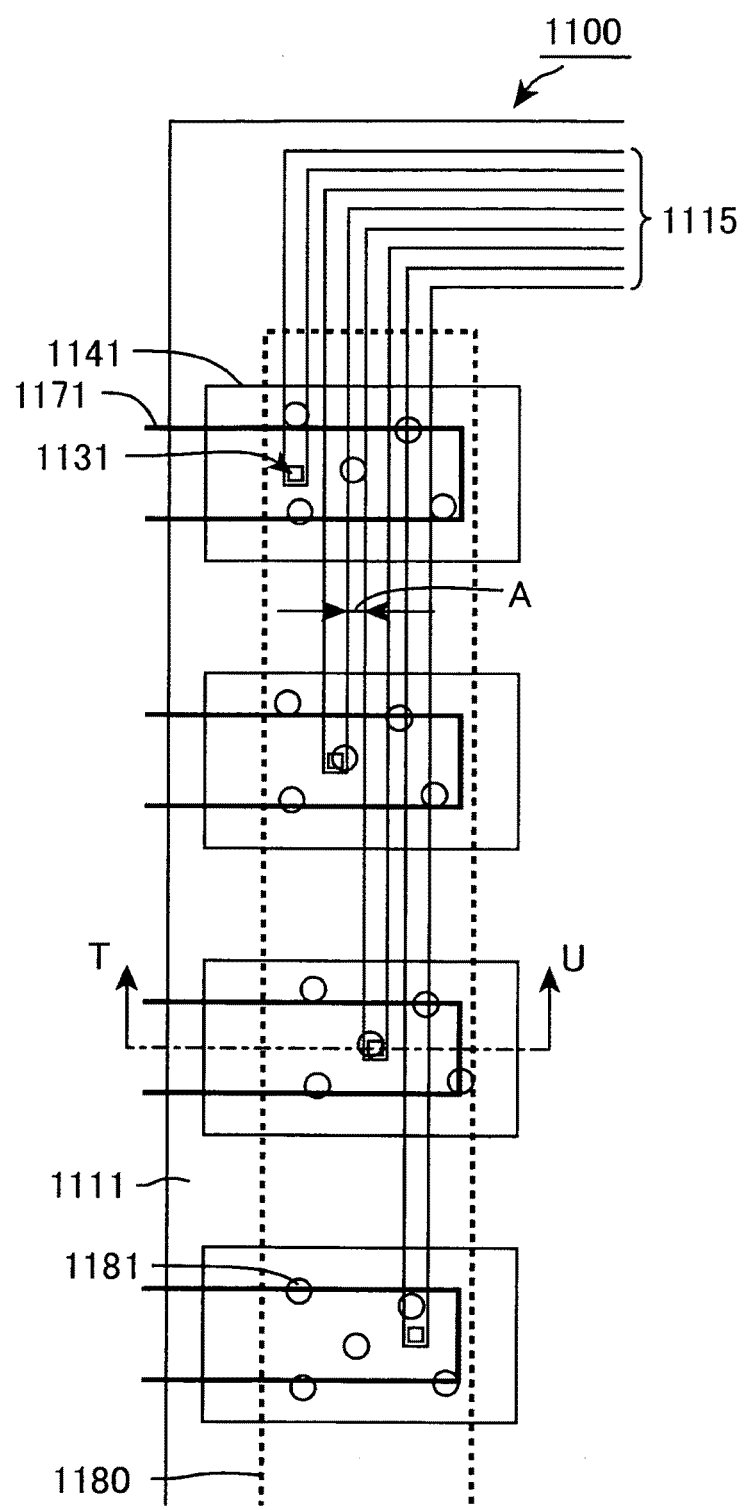
Figures 2, 14:
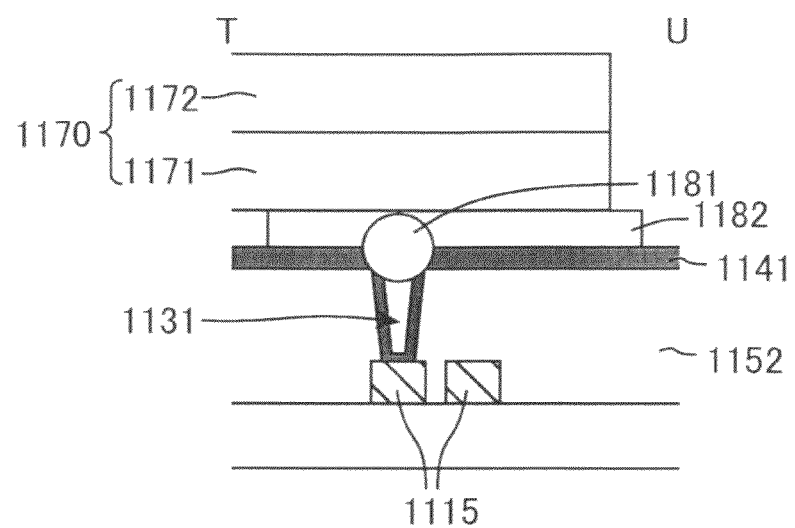

FIG. 14-1 is a schematic cross-sectional view illustrating a configuration of a frame region in a liquid crystal display device of Comparative Embodiment 1. FIG. 14-2 is a schematic cross-sectional view illustrating the configuration of the frame region in a liquid crystal display device of Comparative Embodiment 1 and is a cross-sectional view taken along T-U line in FIG. 14-1.

As illustrated in FIGS. 14-1 and 14-2, a liquid crystal display device 1100 of the present comparative embodiment has a configuration in which a TFT substrate 1111 as a substrate for display device is connected via an ACF 1180 to a FPC substrate 1170 as external connection components in a frame region of the liquid crystal display device 1100.

The FPC substrate 1170 comprises wirings 1171 aligned alongside each other on a base 1172 and the wirings 1171 function as connection terminals (connecting portions) of the FPC substrate 1170.

The TFT substrate 1111 comprises external connection terminals 1141 which correspond to the wirings 1171 in the FPC substrate 1170 and are aligned alongside each other on the base 1172.

An ACF 1180 covers the external connection terminals 1141. The external connection terminals 1141 are connected to the wirings 1171 of the FPC substrate 170 via conductive beads (conductive particles) 1181 that are conductive members in the ACF 1180.

The external connection terminals 1141 are connected through contact holes 1131 provided in the interlayer insulating film 1152, to wiring connecting portions positioned at one ends of common wirings 1115 that are lower wirings formed in a layer below an interlayer insulating film 1152. Each common wiring 1115 extends from the point below the external connection terminal 1141 along the periphery of the TFT substrate 1111 to another portion of the frame region of the TFT substrate 1111 in which the external connection terminals 1141 are not provided, so as to be connected to a semiconductor element formed on the TFT substrate 1111. The semiconductor element is normally a transistor, more specifically a TFT.

Below the external connection terminals 1141, the common wirings 1115 are running alongside each other along the array direction of the external connection terminals 1141. The contact holes 1131 are provided in positions corresponding to the ends of the common wirings 1115 along the running direction of the common wirings 1151 in a region overlapping with the ACF 1180. Further, the contact holes 1131 are arranged in a region where wirings 1171 of the FPC substrate 1170 and the ACF 1180 overlap with each other. Each of the external connection terminals 1141 is connected with any of the common wirings in the region where the wirings 1171 of the FPC substrate 1170 and the ACF 1180 overlap with each other. Namely, the external connection terminal 1141 has a portion connected to the wiring 1171 of the FPC substrate 1170 (portion contacting with the conductive beads 1181) and a portion connected to the common wiring 1115 (portion contacting with the wiring connecting portion of the common wiring 1115) which are overlapping with each other. The portion connected to the common wiring 1115 is positioned in a manner such that the portion overlaps both the wiring 1171 of the FPC substrate 1170 and the ACF 1180.

The TFT substrate 1111 and the FPC substrate 1170 are thermocompressed by interposing the ACF 1180. In this manner, they are connected to each other via the conductive beads 1181 contained in the ACF 1180 and fixed to each other by an adhesive component 1182 comprising a thermosetting resin and the like contained in the ACF 1180.

Further, pressure is applied via the conductive beads 1181 during the thermocompression to the external connection terminals 1141 and their corresponding wirings 1171 of the FPC substrate 1170. Here, the pressure is also applied to the external connection terminals 1141 in normally-thin portions of the film in the contact holes 1131 as the contact holes 1131 are also positioned in regions where the pressure is applied (regions where the wiring 1171 and conductive beads 1181 overlap with each other). This causes a collapse of the external connection terminals 1141 in that portion in the liquid crystal display device of the present comparative embodiment during the thermocompression, resulting in a connection failure. Especially in a case where the conductive beads 1181 contained in the ACF 1180 are used as conductive members, the external connection terminals 1141 may be cut in the shape of a ring so that a connection failure occurs frequently.

Figure 15:
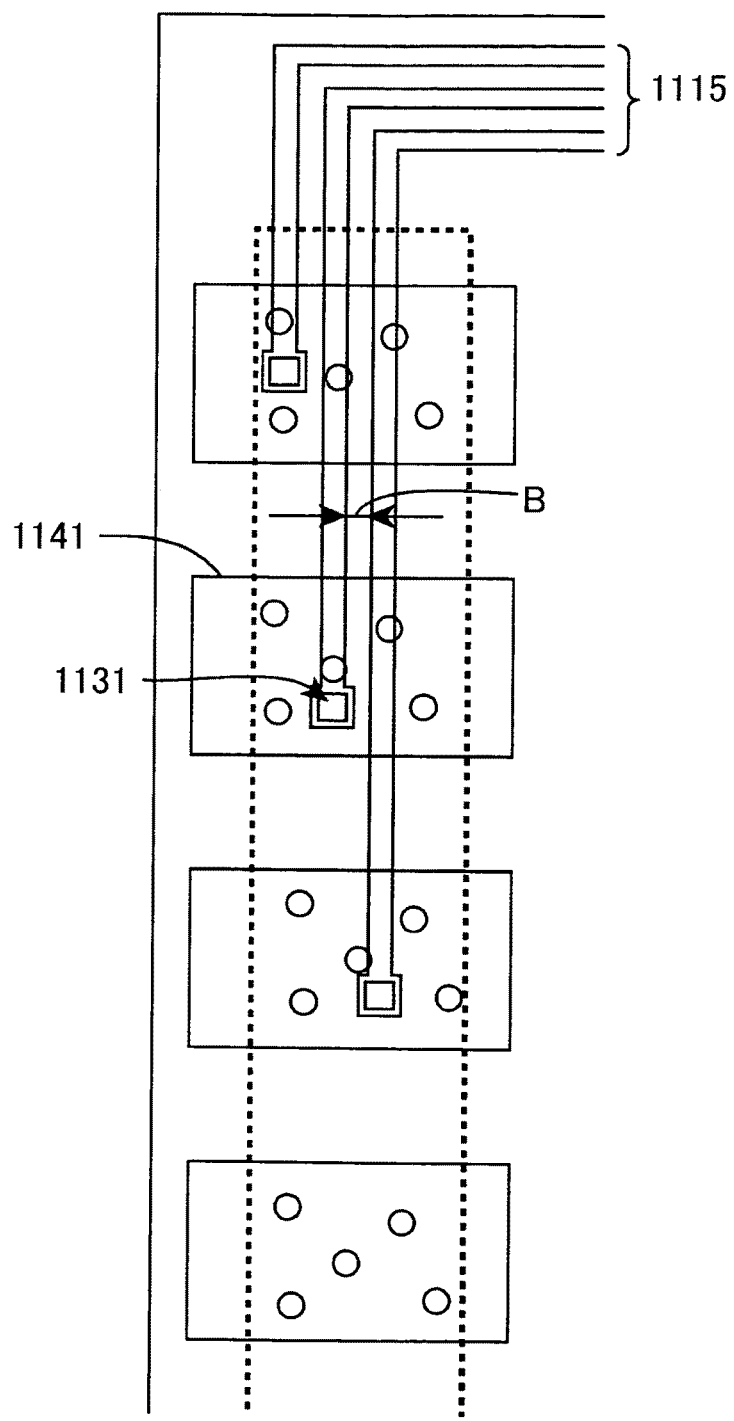
FIG. 15 is a schematic plan view illustrating a modified example of the configuration of the frame region in the liquid crystal display device of the comparative embodiment 1.

FIG. 15 is a schematic plan view illustrating a modified example of the configuration of the frame region in the liquid crystal display device of Comparative Embodiment 1. In the present modified example, the wiring connecting portions of the common wirings 1115 (ends of the common wiring 1115) are designed to be bigger than the width of the common wiring 1115. Additionally, the contact holes 1131 are also larger than those in the comparative embodiment.

The present technical level of mass production allows reduction in linewidth and spacing (line and space) of the wiring groups such as the common wirings 1115 to about 2 μm by dry etching employed in microfabrication. When photolithography is carried out by using the interlayer insulating film 1152 provided on the wiring groups as a photosensitive organic insulating film, line and space of about 4 μm is the limit of microfabrication. Accordingly, in order to form the contact holes 1131 for connecting the wiring groups with the external connection terminals 1141 on such wiring groups, the contact holes 1131 need to be larger than the width of a wiring in the wiring groups from the standpoint of position control accuracy and microprocessing accuracy of the contact holes 1131, as illustrated in FIG. 15. In addition, since the contact holes 1131 are positioned on the running region of the wiring groups, the distance B between the common wirings 1115 is larger than the distance A in the case illustrated in FIG. 14-1, resulting in reduction in number of the wirings which can be arranged below the external connection terminal 1141.

The present application claims priority to Patent Application No. 2008-311121 filed in Japan on Dec. 5, 2008 under the Paris Convention and provisions of national law in a designated State, the entire contents of which are hereby incorporated by reference.

Explanation Of Numerals And Symbols

100, 200, 300: Liquid crystal display device
111, 211, 311: TFT substrate
112: Wiring (Lower wiring)
115, 215, 315, 316, 317, 318, 319, 327: Common wiring
121, 221, 321: Insulating substrate
122, 322: Basecoat film
123, 323: Semiconductor layer
124, 324: Gate insulating film
125, 325: Gate electrode
128, 328: Source drain electrode
129, 329: TFT
130, 330: Routing wiring
131, 132, 133, 231, 331, 332, 333, 334: Contact hole
141, 142, 143, 241, 341: External connection terminal
146, 346, 347, 348: Circuit block
151, 152, 252, 351, 352: Interlayer insulating film
161, 361: First wiring layer
162, 262, 362: Second wiring layer
163, 263, 363: Third wiring layer
164, 264, 364: Transparent conductive layer
170, 270, 370: Rigid FPC
171, 271, 371: Wiring (Wiring of FPC)
172, 272, 372: Base
175, 275: IC chip
176, 276: Signal input bump
177, 277: Signal output bump
180, 280, 380: ACF
181, 281, 381: Conductive beads (conductive particles)
182, 282, 382: Adhesive component
255: Sealing material
256: Photo spacer
257: Insulating film
258: Glass fiber
265: Pixel electrode
266: Lower conductive film
267: Upper conductive film
313: Upper wiring
326: Source line
339: High-resistance region
345: ESD (electro-static discharge) protection circuits

The invention claimed is:

1. A display device, comprising:
a substrate that includes:
   a plurality of external connection terminals;
   a plurality of lower wirings running below the plurality of external connection terminals;
   an interlayer insulating film positioned between a layer of the plurality of external connection terminals and a layer of the plurality of lower wirings and provided with a plurality of connection holes, wherein
      the plurality of lower wirings are running alongside each other in a running direction crossing the plurality of external connection terminals and bent toward a same side with respect to the running direction in order from an endmost lower wiring, in a plan view of the substrate, and
      each of the plurality of external connection terminals is connected through at least one of the plurality of connection holes to a portion beyond a bent portion of any of the plurality of lower wirings;
an external connection component having a plurality of connecting portions;
a plurality of conductive members electrically connecting the substrate with the external connection component, wherein
   each of the plurality of external connection terminals is connected via at least one of the plurality of conductive members to any of the plurality of connecting portions, and
   the plurality of connection holes are positioned outside a region where the plurality of connecting portions and the plurality of conductive members overlap each other, in a plan view of the substrate; and
a sealing material for sealing a display element, wherein the plurality of connection holes are positioned further toward an inner side of the substrate than the sealing material, in a plan view of the substrate.

2. The display device according to claim 1, wherein the plurality of connection holes are provided collinearly in a plan view of the substrate.

3. The display device according to claim 1, wherein the plurality of connection holes are positioned between the sealing material and the region where the plurality of connecting portions and the plurality of conductive members overlap each other, in a plan view of the substrate for display device.

4. The display device according to claim 1, wherein the plurality of conductive members include conductive particles.

5. The substrate for display device according to claim 1, the bent portion is a portion of the lower wirings that is bent in a direction orthogonal to the running direction.

6. The substrate for display device according to claim 1, wherein the plurality of lower wirings cross the plurality of external connections in the running direction.

7. A display device, comprising:
a substrate that includes:
   a plurality of external connection terminals;
   a plurality of lower wirings running below the plurality of external connection terminals;
   an interlayer insulating film positioned between a layer of the plurality of external connection terminals and a layer of the plurality of lower wirings and provided with a plurality of connection holes, wherein the plurality of lower wirings are running alongside each other in a running direction crossing the plurality of external connection terminals and bent toward a same side with respect to the running direction in order from an endmost lower wiring, in a plan view of the substrate, and each of the plurality of external connection terminals is connected through at least one of the plurality of connection holes to a portion beyond a bent portion of any of the plurality of lower wirings;

an external connection component having a plurality of connecting portions;

a plurality of conductive members electrically connecting the substrate with the external connection component, wherein each of the plurality of external connection terminals is connected via at least one of the plurality of conductive members to any of the plurality of connecting portions, and the plurality of connection holes are positioned outside a region where the plurality of connecting portions and the plurality of conductive members overlap each other, in a plan view of the substrate; and a sealing material for sealing a display element, wherein the plurality of connection holes overlap the sealing material in a plan view of the substrate.

8. The display device according to claim 7, wherein the substrate further comprises a photo spacer positioned in the sealing material.

9. The display device according to claim 7, wherein the substrate further comprises an insulating film formed below the sealing material.

10. The display device according to claim 7, wherein the plurality of connection holes are provided collinearly in a plan view of the substrate.

11. The display device according to claim 7, wherein the plurality of conductive members include conductive particles.

12. The display device according to claim 9, wherein the insulating film is positioned below substantially the entire sealing material.

* * * * *